(12) United States Patent
Li

(10) Patent No.: US 11,255,736 B2
(45) Date of Patent: Feb. 22, 2022

(54) VIBRATION SENSOR AND SENSOR MODULE

(71) Applicant: KABUSHIKI KAISHA TOSHIBA, Tokyo (JP)

(72) Inventor: Yongfang Li, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 171 days.

(21) Appl. No.: 16/286,708

(22) Filed: Feb. 27, 2019

(65) Prior Publication Data

US 2019/0360880 A1 Nov. 28, 2019

(30) Foreign Application Priority Data

May 25, 2018 (JP) .............................. JP2018-100554

(51) Int. Cl.
*G01L 1/16* (2006.01)
*G01C 19/56* (2012.01)

(52) U.S. Cl.
CPC .............. *G01L 1/162* (2013.01); *G01C 19/56* (2013.01)

(58) Field of Classification Search
CPC .................................. G01L 1/162; G01C 19/56
See application file for complete search history.

(56) References Cited

U.S. PATENT DOCUMENTS

| 7,104,134 B2 | 9/2006 | Amano et al. |
| 2010/0148627 A1 | 6/2010 | Funasaka et al. |
| 2012/0250127 A1 | 10/2012 | Naono |
| 2013/0320807 A1 | 12/2013 | Sakaguchi et al. |
| 2014/0116188 A1 | 5/2014 | Fujimoto et al. |

FOREIGN PATENT DOCUMENTS

| JP | 2005-249785 A | 9/2005 |
| JP | 2009-128020 A | 6/2009 |
| JP | 2010-165341 A | 7/2010 |
| JP | 2011-177831 A | 9/2011 |
| JP | 2011-247789 A | 12/2011 |
| JP | 2012-208352 A | 10/2012 |

(Continued)

OTHER PUBLICATIONS

Sonmezoglu et al., "Passive Signal Amplification via Series—Piezoelectric Read-Out," Transducers 2017, pp. 155-158 (Jun. 18-22, 2017).

(Continued)

*Primary Examiner* — Ryan D Walsh
(74) *Attorney, Agent, or Firm* — Finnegan, Henderson, Farabow, Garrett & Dunner L.L.P.

(57) ABSTRACT

A vibration sensor according to an embodiment includes a laminated body. The laminated body includes a support layer a first end of which is fixed; a piezoelectric layer on the support layer; an insulating layer disposed between the support layer and the piezoelectric layer; a common electrode disposed on a first principal surface of the piezoelectric layer; a first sensing electrode disposed in a first area on a second principal surface of the piezoelectric layer on the side opposite to the first principal surface; and a drive electrode disposed in a second area different from the first area on the second principal surface of the piezoelectric layer. The first area is located near the first end of the support layer.

19 Claims, 18 Drawing Sheets

(56) References Cited

FOREIGN PATENT DOCUMENTS

| | | | |
|---|---|---|---|
| JP | 2014-157095 A | | 8/2014 |
| JP | 2015-81771 A | | 4/2015 |
| JP | 2016031237 A | * | 3/2016 |
| JP | 2016-92089 A | | 5/2016 |
| JP | 2017-181164 A | | 10/2017 |
| WO | WO 2012/137695 A1 | | 10/2012 |
| WO | WO 2013/018788 A1 | | 2/2013 |
| WO | WO 2018/020639 A1 | | 2/2018 |

OTHER PUBLICATIONS

Takei et al., "Design of piezoelectric MEMS cantilever for low-frequency vibration energy harvester," Japanese Journal of Applied Physics, 55:06GP14, pp. 06GP14-1 to 06GP14-5 (May 23, 2016).

* cited by examiner

VIBRATION SENSOR AND SENSOR MODULE

CROSS-REFERENCE TO RELATED APPLICATIONS

This application is based upon and claims the benefit of priority from Japanese Patent Application No. 2018-100554, filed on May 25, 2018; the entire contents of which are incorporated herein by reference.

FIELD

Embodiments described herein relate generally to vibration sensors and a sensor module.

BACKGROUND

Vibration sensors have conventionally been around as sensors to detect minute vibrations of structures, electronic devices, or the like, and grasp the status and state thereof. Vibration sensors are very important in securing safety and reliability of structures, electronic devices, or the like, and in determining whether maintenance needs to be performed, for example.

DETAILED DESCRIPTION

A vibration sensor according to an embodiment includes a laminated body. The laminated body includes a support layer a first end of which is fixed; a piezoelectric layer on the support layer; an insulating layer disposed between the support layer and the piezoelectric layer; a common electrode disposed on a first principal surface of the piezoelectric layer; a first sensing electrode disposed in a first area on a second principal surface of the piezoelectric layer on the side opposite to the first principal surface; and a drive electrode disposed in a second area different from the first area on the second principal surface of the piezoelectric layer. The first area is located near the first end of the support layer.

Vibration sensors and a sensor module according to exemplary embodiments are described in detail below with reference to the accompanying drawings.

Examples of vibration sensors include piezoresistive sensors that utilize a piezoresistance effect, capacitive sensors that utilize a change in capacitance, and piezoelectric sensors that utilize a piezoelectric effect. Of the foregoing, piezoelectric vibration sensors need no external power supply, having a high degree of flexibility, and are also capable of generating enough power on their own to transmit detected data by radio waves, having the advantage of consuming less power. Moreover, piezoelectric vibration sensors, in which excitation can be achieved by applying a voltage, have an advantage in that calibration is possible not only for sensing but also for the sensors themselves.

Piezoelectric vibration sensors of micro electro mechanical systems (MEMS) are of great advantage to cost and size reductions. At the same time, MEMS-type piezoelectric vibration sensors have difficulty in enhancing their sensitivity to minute vibrations and sometimes have difficulty in achieving adequate sensitivity.

It is therefore an object of the embodiments described herein to provide vibration sensors and a sensor module that are capable of enhancing their sensitivity to minute vibrations.

First Embodiment

Figure 1A:
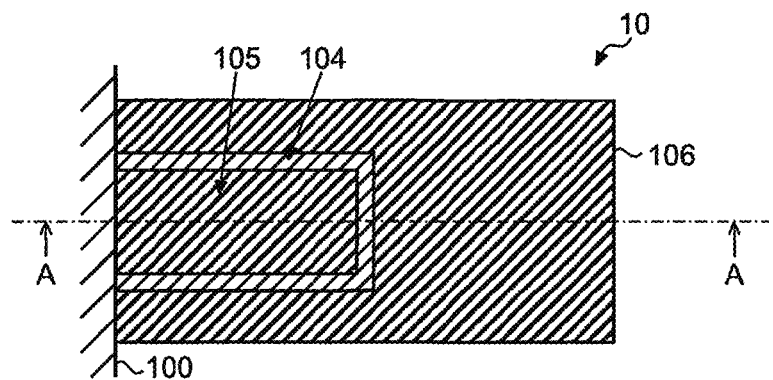
FIG. 1A is a schematic diagram illustrating an example structure of a vibration sensor according to a first embodiment.
Figure 1B:
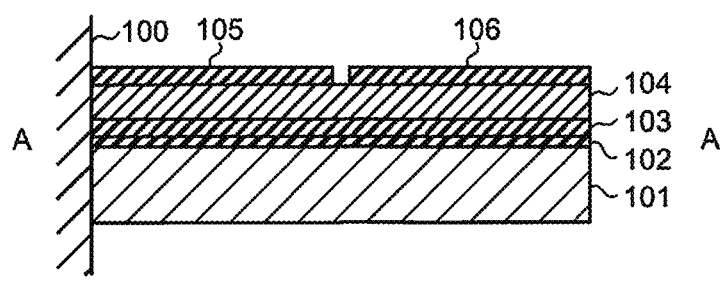
FIG. 1B is a schematic diagram illustrating an example structure of a vibration sensor according to a first embodiment.

A vibration sensor according to a first embodiment is first described in detail with reference to the drawings. FIG. 1A and FIG. 1B are schematic diagrams illustrating an example structure of a vibration sensor according to the first embodiment. FIG. 1A is a top view of a vibration sensor 10, and FIG. 1B is a sectional view taken along line A-A in FIG. 1A.

As illustrated in FIG. 1A and FIG. 1B, the vibration sensor 10 according to the present embodiment is a MEMS-type piezoelectric vibration sensor including a cantilever structure (hereinafter referred to as a cantilever structure for convenience of description), and includes a support layer 101, an insulating layer 102, a common electrode 103, a piezoelectric layer 104, a sensing electrode 105, and a drive electrode 106. The support layer 101, the insulating layer 102, the common electrode 103, the piezoelectric layer 104, the sensing electrode 105, and the drive electrode 106 constitute the cantilever structure jutting from a support 100.

The support layer 101 is a plate-like structure jutting from the support 100. The support layer 101 may jut from the support 100 in such a manner that at least one principal surface is substantially normal to the support 100. The support layer 101 may be a member integral with the support 100, or may be a member different from that of the support 100. Various materials, such as bulk silicon, can be used as the material of the support layer 101. In the description, a principal surface is a surface that has the largest area in the structure. The support layer 101 may be worked into a shape in which the weight concentrates on the tip of the cantilever structure, for example.

The plate-like support layer 101 includes two principal surfaces made up of the front and back sides thereof. Of these two principal surfaces, one principal surface (this is also referred to as a surface or top surface) has the piezoelectric layer 104 arranged thereabove that has the same size as the principal surface, for example. Various piezoelectric materials, such as aluminum nitride (AlN), aluminum scandium nitride (AlScN), (K,Na) NbO$_3$ (KNN), zinc oxide (ZnO), lead zirconate titanate (PZT), lead zinc niobate (Pb(Zn$_{1/3}$Nb$_{2/3}$)O$_3$: PZN-PT), lead magnesium niobate (Pb(Mg$_{1/3}$Nb$_{2/3}$)O$_3$: PMN-PT), can be used for the piezoelectric layer 104.

Of two principal surfaces of the piezoelectric layer 104, one principal surface on the support layer 101 side (this is referred to as a first principal surface) has the common electrode 103 disposed thereon. The common electrode 103 may have a size to cover the whole of the first principal surface, or may have a size to cover a part of the first principal surface. Metals, such as platinum (Pt), molybdenum (Mo), aluminum (Al), and gold (Au), or other conductive materials, for example, can be used for the common electrode 103.

The insulating layer 102 is disposed between the common electrode 103 and the support layer 101. This structure keeps the common electrode 103 and the support layer 101 electrically separated. Various insulating materials, such as silicon oxide (SiO$_2$), can be used for the insulating layer 102. The support layer 101 and the insulating layer 102 can be composed of the same material (for example, an insulating material such as silicon oxide).

Of the two principal surfaces of the piezoelectric layer 104, a second principal surface on the side opposite to the first principal surface has the sensing electrode 105 and the drive electrode 106 disposed thereon. Metals, such as gold (Au), molybdenum (Mo), aluminum (Al), and platinum (Pt), or other conductive materials, for example, can be used for the sensing electrode 105 and the drive electrode 106. The sensing electrode 105 and the drive electrode 106 are both electrodes that confront the common electrode 103 through the piezoelectric layer 104. Of these electrodes, the sensing electrode 105 serves as an electrode for extracting, as an electric signal, polarization generated on the surface of the piezoelectric layer 104 by vibrations. Meanwhile, the drive electrode 106 serves as an electrode for calibrating the vibration sensor 10 by utilizing an inverse piezoelectric effect obtained by applying an electric field to the piezoelectric layer 104.

The sensing electrode 105 and the drive electrode 106 are both designed to have optimum sizes and arrangements. For example, the sensing electrode 105 may be disposed in an area that is on the second principal surface of the piezoelectric layer 104 and near the base of the vibration sensor 10, which is a structure jutting from the support 100. Meanwhile, the drive electrode 106 may be disposed in the remaining area on the second principal surface of the piezoelectric layer 104 so as to surround the sensing electrode 105 (except the base side. the same applies hereinafter) while spacing a few micrometers to a few tens of micrometers from the sensing electrode 105.

When the vibration sensor 10 including the structure as described above undergoes a vibration from the outside, a stress is generated near the base of the vibration sensor 10. As a result, an electric charge generated on the surface of the piezoelectric layer 104 by a piezoelectric effect builds up on the common electrode 103 and the sensing electrode 105 between which the piezoelectric layer 104 is sandwiched. A potential difference arisen between the sensing electrode 105 and the common electrode 103 is then detected, whereby the vibration can be detected.

With a structure in which resonance of the cantilever structure is utilized, the sensitivity to vibrations can be enhanced and frequencies of the vibrations can also be identified depending on whether the structure is in a resonance state.

Furthermore, in order to check the state of the vibration sensor 10 itself, an alternating voltage can be applied to the drive electrode 106 and the common electrode 103 to excite vibrations, thereby enabling calibration to be performed. At that time, a potential difference between the sensing electrode 105 and the common electrode 103 is utilized to monitor the amplitude of the vibration sensor 10 during calibration, so that the state of the vibration sensor 10 itself can be grasped.

Because arranging the sensing electrode 105 near the base of the cantilever structure increases the output voltage of the vibration sensor 10 during sensing, the sensitivity of the vibration sensor 10 to vibrations can be enhanced. Also, arranging the drive electrode 106 so as to surround the sensing electrode 105 can cause the vibration sensor 10 to vibrate efficiently. As a result, driving performance and sensing sensitivity during calibration can be mutually compatible.

The size of the sensing electrode 105 is described next. In order to determine the size of the sensing electrode 105, the dependence on sensitivity when the length and width of the sensing electrode 105 were changed with respect to a length L and a width W of the second principal surface of the piezoelectric layer 104 has been studied in the present embodiment.

Figure 2:
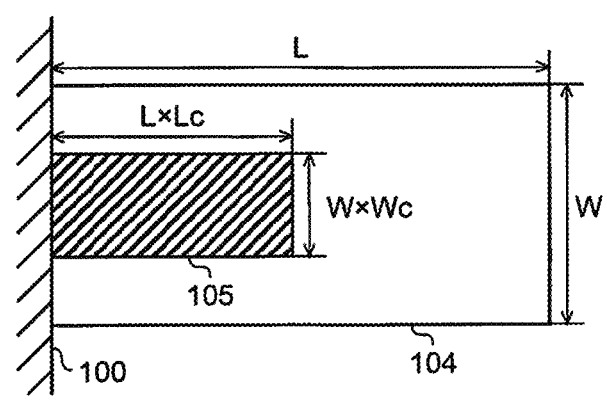
FIG. 2 is a diagram for illustrating the vibration sensor used for a study to determine the size of a sensing electrode according to the first embodiment.

FIG. 2 is a diagram for illustrating the vibration sensor used for a study to determine the size of a sensing electrode according to the present embodiment. As illustrated in FIG. 2, the contraction ratio of the length of the sensing electrode 105 with respect to the length of the cantilever structure (corresponding to the length of the support layer 101) L is assumed to be Lc, the contraction ratio of the width of the sensing electrode 105 with respect to the width of the cantilever structure (corresponding to the width of the support layer 101) W be Wc, the size of the piezoelectric layer 104 be the same as the size of the support layer 101, the length L of the piezoelectric layer 104 be 400 μm, and the width W thereof be 50 μm in the study. The support layer 101 is assumed to be a Si layer having a film thickness of 3 μm, the insulating layer 102 be a $SiO_2$ layer having a film thickness of 200 nm, the common electrode 103 be a Pt layer having a film thickness of 100 nm, the piezoelectric layer 104 be a PZT layer having a film thickness of 3 μm, and the sensing electrode 105 be a Au layer having a film thickness of 100 nm. Furthermore, as illustrated in FIG. 2, the drive electrode 106 is omitted, and the size of the common electrode 103 is assumed to be the same as the size of the first principal surface of the piezoelectric layer 104 for convenience of description in the study.

Figure 3:
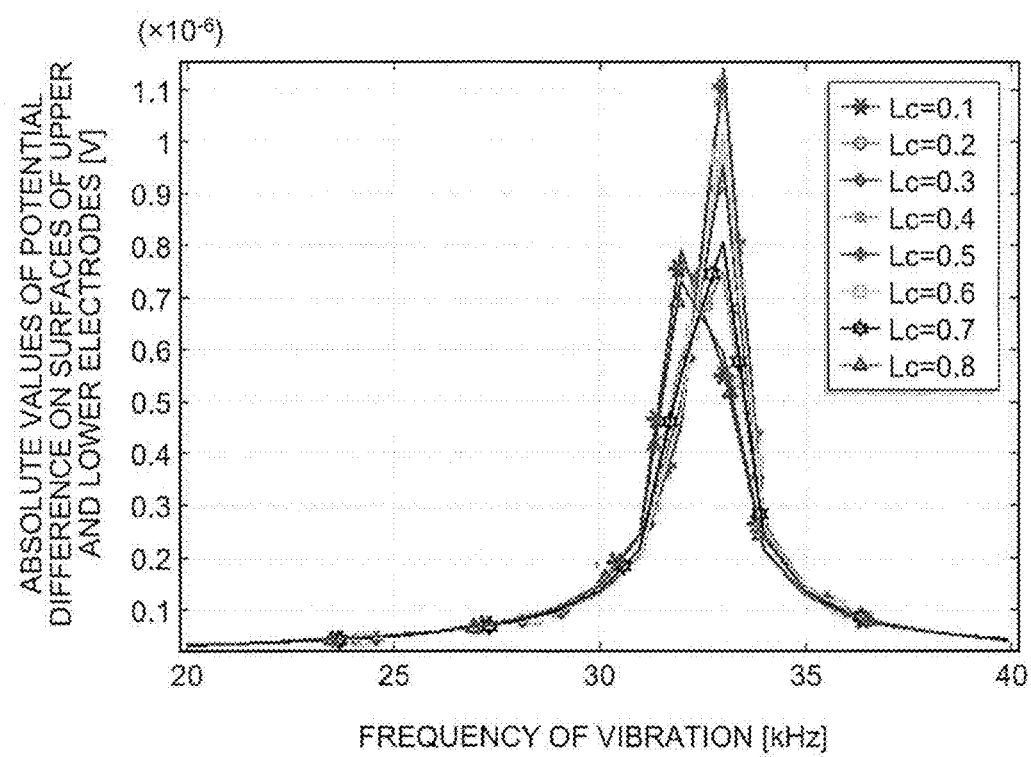
FIG. 3 is a graph illustrating sensitivity characteristics with respect to the contraction ratio of the electrode in the length direction of the vibration sensor according to the first embodiment.
Figure 4:
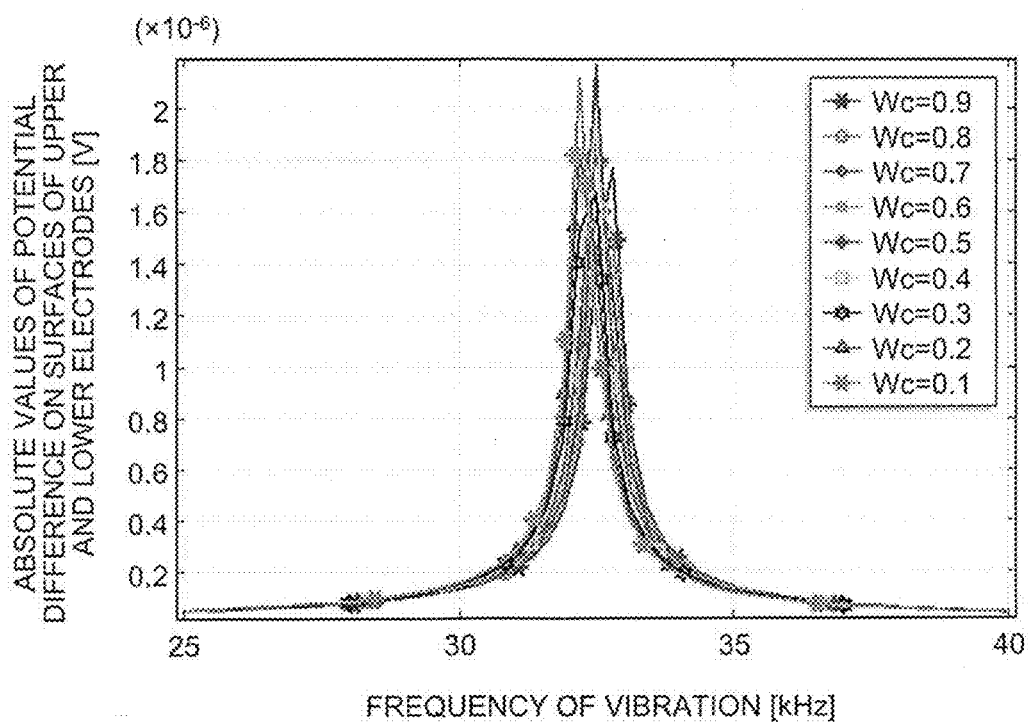
FIG. 4 is a graph illustrating sensitivity characteristics with respect to the contraction ratio of the electrode in the width direction of the vibration sensor according to the first embodiment.

FIG. 3 is a graph illustrating sensitivity characteristics with respect to the contraction ratio of the electrode in the length direction of the vibration sensor according to the present embodiment. FIG. 4 is a graph illustrating sensitivity characteristics with respect to the contraction ratio of the electrode in the width direction of the vibration sensor according to the present embodiment. FIG. 3 and FIG. 4 illustrate sensitivity characteristics as absolute values (corresponding to the output voltages) of the potential difference on the surfaces of upper and lower electrodes (corresponding to the common electrode 103 and the sensing electrode 105) with respect to the frequency of the vibration.

FIG. 3 illustrates the sensitivity characteristics when the contraction ratio Lc of the sensing electrode 105 in the length direction is changed by 0.1 from 0.1 to 0.8 in a case in which the width of the sensing electrode 105 is the same as the width W of the piezoelectric layer 104. As illustrated in FIG. 3, when the contraction ratio Lc is 0.5, in other words, when the length of the sensing electrode 105 is half the length L of the cantilever structure, the sensitivity characteristics of the vibration sensor 10 are most favorable. When the contraction ratio Lc is within a range of 0.3 to 0.7, the sensitivity characteristics of the vibration sensor 10 are kept in a favorable range. Even when the contraction ratio Lc is within a range of 0.1 to 0.3 or 0.7 to 0.9, it is evident that adequate sensitivity characteristics of the vibration sensor 10 are achieved.

FIG. 4 illustrates the sensitivity characteristics when the contraction ratio Wc of the sensing electrode 105 in the width direction is changed by 0.1 from 0.1 to 0.9 in a case in which the length of the sensing electrode 105 is half the length L of the piezoelectric layer 104. As illustrated in FIG. 4, the sensitivity characteristics of the vibration sensor 10 are stable toward the change of the sensing electrode 105 in the width direction, compared with the sensitivity characteristics of the vibration sensor 10 toward the change of the sensing electrode 105 in the length direction (see FIG. 3). When the contraction ratio Wc is 0.5, in other words, when the width of the sensing electrode 105 is half the width W of the cantilever structure, the sensitivity characteristics of the vibration sensor 10 are most favorable. When the contraction ratio Wc is within a range of 0.3 to 0.7, the sensitivity characteristics of the vibration sensor 10 are kept in a favorable range. Even when the contraction ratio Wc is within a range of 0.1 to 0.3 or 0.7 to 0.9, it is evident that adequate sensitivity characteristics of the vibration sensor 10 are achieved. However, the sensing electrode 105 has lower limits of the length and width because of the constraints arising from its manufacturing process, the sensing electrode 105 preferably has a length and width that are equal to or greater than the lower length and width limits (for example, a few micrometers to 10 micrometers).

The findings suggest that the vibration sensor 10 has the highest sensitivity when both the width and the length of the sensing electrode 105 are half the width W and the length L of the cantilever structure.

As described above, the vibration sensor 10 according to the present embodiment is a MEMS-type piezoelectric vibration sensor including the cantilever structure, and includes the structure in which the sensing electrode 105 is disposed near the base of the cantilever structure. In this manner, the sensing electrode 105 for detecting vibrations is disposed near the base of the vibration sensor 10 on which the stress generated by vibrations concentrates, so that vibrations can be detected more effectively. Consequently, the sensitivity to vibrations can be enhanced.

The vibration sensor 10 according to the present embodiment can also utilize the resonance of the cantilever structure. Thus, the sensitivity to vibrations can be enhanced and frequencies of the vibrations can also be identified depending on whether the structure is in a resonance state.

Furthermore, the drive electrode 106 is disposed in the entire remaining area on the second principal surface of the piezoelectric layer 104 so as to surround the sensing electrode 105 while spacing a few micrometers to a few tens of micrometers from the sensing electrode 105 in the vibration sensor 10 according to the present embodiment. Consequently, the vibration sensor 10 can be achieved in which driving performance and sensing sensitivity are mutually compatible.

Second Embodiment

Subsequently, a vibration sensor according to a second embodiment is described in detail with reference to the drawings. In the first embodiment, the vibration sensor 10 has been described that has the cantilever structure in which one end is a fixed end and the other end is a free end. In contrast to this, a vibration sensor is described with an example that has a fixed-fixed beam structure in which both ends are fixed ends in the second embodiment. In the description below, components similar to those in the first embodiment are given the same reference numerals, and overlapping description thereof is omitted.

Figure 5A:
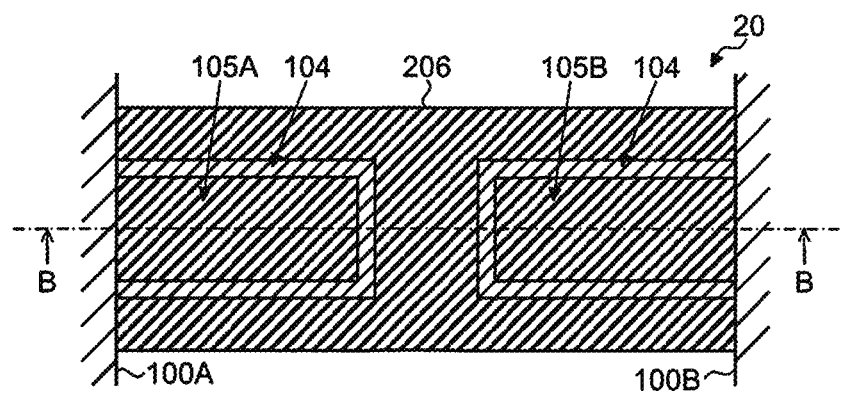
FIG. 5A is a schematic diagram illustrating an example structure of a vibration sensor according to a second embodiment.
Figure 5B:
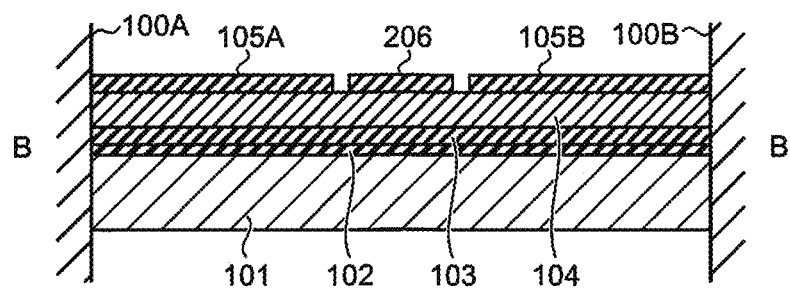
FIG. 5B is a schematic diagram illustrating an example structure of a vibration sensor according to a second embodiment.

FIG. 5A and FIG. 5B are schematic diagrams illustrating an example structure of a vibration sensor according to the second embodiment. FIG. 5A is a top view of a vibration sensor 20, and FIG. 5B is a sectional view taken along line B-B in FIG. 5A.

As illustrated in FIG. 5A and FIG. 5B, the vibration sensor 20 according to the present embodiment includes a structure in which both ends of a laminated body that is made up of the support layer 101, the insulating layer 102, the common electrode 103, and the piezoelectric layer 104 are fixed to supports 100A and 100B in a structure similar to that of the vibration sensor 10 according to the first embodiment. A sensing electrode 105A is disposed near the base of the laminated body on the side of the support 100A, and a sensing electrode 105B is disposed near the base of thereof on the side of the support 100B. In other words, stresses generated near the bases of two ends are utilized to sense vibrations in the vibration sensor 20 according to the present embodiment. This enables vibrations to be detected more effectively, as is the case with the first embodiment. Consequently, the sensitivity to vibrations can be enhanced.

A drive electrode 206 may be disposed in the remaining area on the second principal surface of the piezoelectric layer 104 so as to surround the sensing electrodes 105A and 105B while spacing a few micrometers to a few tens of micrometers from the sensing electrodes 105A and 105B.

At least one of the supports 100A and 100B does not need to be a fixed member, and may serve as a weight, for example. In this case, the amplitude of the output voltage from the vibration sensor 20 can be increased, so that the sensitivity can be enhanced.

The vibration sensor 20 has a sectional structure and other structures, operations, and effects similar to those of the first embodiment, and detailed description thereof is thus omitted.

Third Embodiment

Subsequently, a vibration sensor according to a third embodiment is described in detail with reference to the drawings. In the present embodiment, a case is described with an example in which a plurality of vibration sensors according to embodiments described above or below are connected to each other to constitute one vibration sensor. In the description below, components similar to those in the above embodiments are given the same reference numerals, and overlapping description thereof is omitted.

Figure 6:
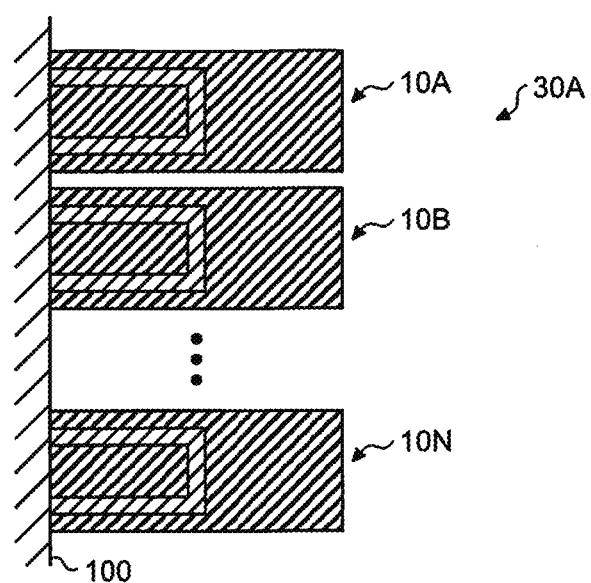
FIG. 6 is a schematic diagram illustrating an example structure of a vibration sensor according to a third embodiment.
Figure 7:
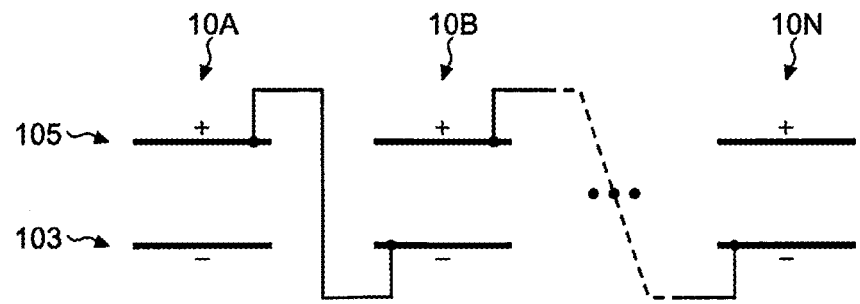
FIG. 7 is a diagram illustrating an example of an electric connection of a sensor portion in the vibration sensor illustrated in FIG. 6.
Figure 8:
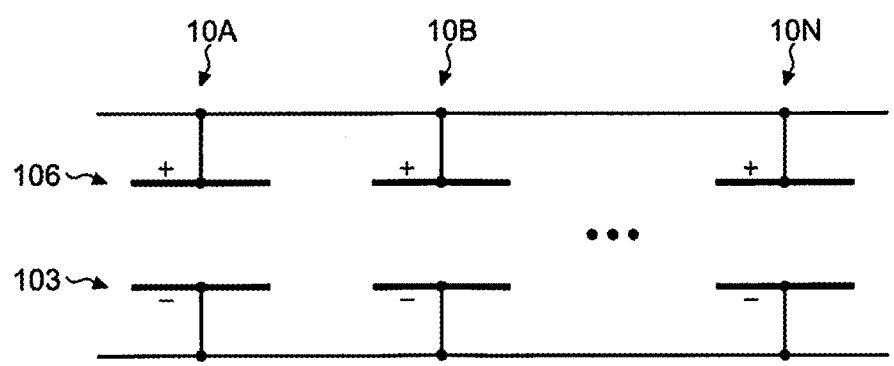
FIG. 8 is a diagram illustrating an example of an electric connection of a drive portion in the vibration sensor illustrated in FIG. 6.

A case is first described in detail with reference to the drawings in which a plurality of vibration sensors 10 according to the first embodiment are connected to each other to constitute one vibration sensor. FIG. 6 is a schematic diagram illustrating an example structure of a vibration sensor according to the third embodiment. FIG. 7 is a diagram illustrating an example of an electric connection of a sensor portion in the vibration sensor illustrated in FIG. 6. FIG. 8 is a diagram illustrating an example of an electric connection of a drive portion in the vibration sensor illustrated in FIG. 6.

As illustrated in FIG. 6, a vibration sensor 30A having a cantilever structure according to the present embodiment includes a structure in which a plurality of vibration sensors 10A to 10N each including a structure similar to the vibration sensor 10 according to the first embodiment, for example, are arrayed. A plurality of vibration sensors 10A to 10N may be fixed to the same support 100, or at least a part thereof may be fixed to a different support.

A sensor portion of the vibration sensor 30A having such a structure includes a structure in which the sensing electrode 105 of a vibration sensor 10 (for example, the vibration sensor 10A) is connected to the common electrode 103 of a vibration sensor 10 (for example, the vibration sensor 10B) that is arranged at the subsequent stage, as illustrated in FIG. 7. In other words, if attention is focused on the sensor portion, a plurality of vibration sensors 10A to 10N are connected in series. With this structure, the gain of the output voltage from the vibration sensor 30A can be increased in accordance with the number of vibration sensors 10 combined.

Meanwhile, a drive portion of the vibration sensor 30A includes a structure in which the drive electrodes 106 are connected in parallel and the common electrodes 103 are also connected in parallel across a plurality of vibration sensors 10A to 10N, as illustrated in FIG. 8. In other words, if attention is focused on the drive portion, a plurality of vibration sensors 10A to 10N are connected in parallel. With this structure, a plurality of vibration sensors 10A to 10N can be driven by batch during calibration, for example.

Figure 9:
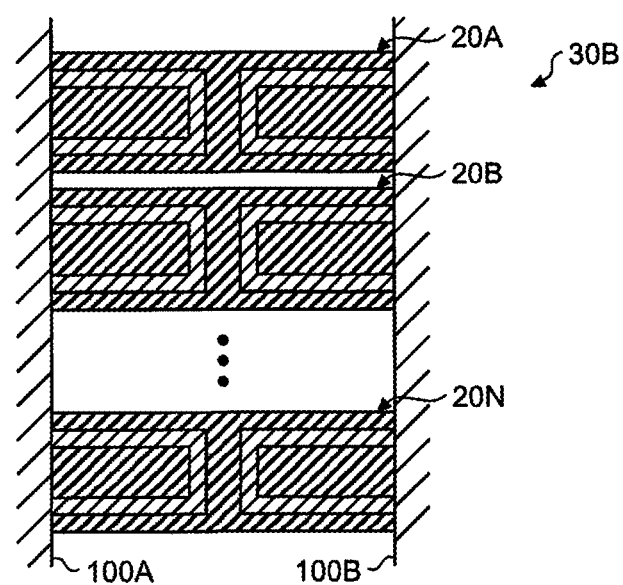
FIG. 9 is a schematic diagram illustrating an example structure of another vibration sensor according to the third embodiment.
Figure 10:
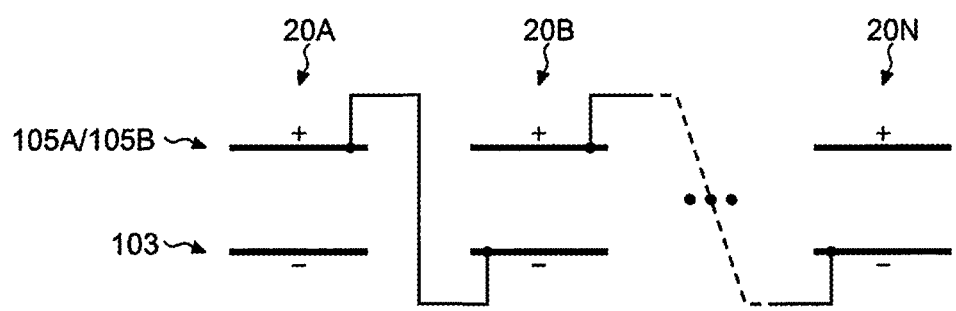
FIG. 10 is a diagram illustrating an example of an electric connection of a sensor portion in the vibration sensor illustrated in FIG. 9.
Figure 11:
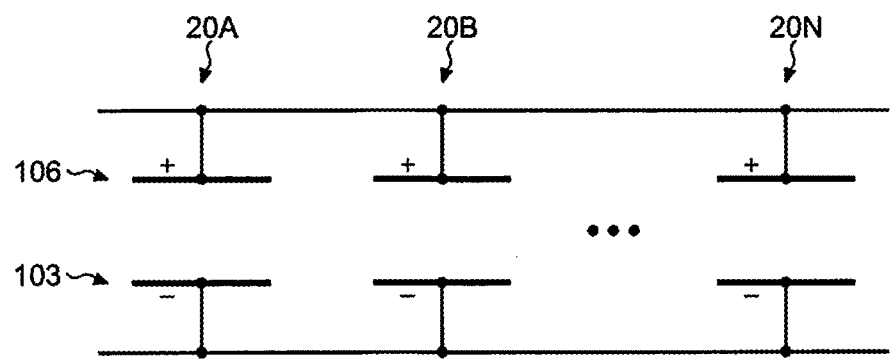
FIG. 11 is a diagram illustrating an example of an electric connection of a drive portion in the vibration sensor illustrated in FIG. 9.

Subsequently, a case is described in detail with reference to the drawings in which a plurality of vibration sensors 20 having the fixed-fixed beam structure according to the second embodiment are connected to each other to constitute one vibration sensor. FIG. 9 is a schematic diagram illustrating an example structure of another vibration sensor according to the third embodiment. FIG. 10 is a diagram illustrating an example of an electric connection of a sensor portion in the vibration sensor illustrated in FIG. 9. FIG. 11 is a diagram illustrating an example of an electric connection of a drive portion in the vibration sensor illustrated in FIG. 9.

As illustrated in FIG. 9, a vibration sensor 30B having a cantilever structure according to the present embodiment includes a structure in which a plurality of vibration sensors 20A to 20N each including a structure similar to the vibration sensor 20 according to the second embodiment, for example, are arrayed. A plurality of vibration sensors 20A to 20N may be fixed to the same supports 100A and 100B, or at least a part thereof may be fixed to a different support.

As illustrated in FIG. 10, a sensor portion of the vibration sensor 30B includes a structure in which a plurality of vibration sensors 20A to 20N are connected in series, as is the case with the vibration sensor 30A illustrated in FIG. 6 to FIG. 8. With this structure, the gain of the output voltage from the vibration sensor 30B can be increased according to the number of vibration sensors 20 combined. A series of the respective sensing electrode 105A sides of the vibration sensors 20A to 20N connected in series and a series of the respective sensing electrode 105B sides thereof connected in series may be independent from each other, or both series may be further connected to each other in series. Alternatively, the respective sensing electrode 105A sides of the vibration sensors 20A to 20N and the respective sensing electrode 105B sides thereof may be configured to be connected alternately in series.

As illustrated in FIG. 11, a drive portion of the vibration sensor 30B includes a structure in which a plurality of vibration sensors 20A to 20N are connected in parallel, as is the case with the vibration sensor 30A illustrated in FIG. 6 to FIG. 8. With this structure, a plurality of vibration sensors 20A to 20N can be driven by batch during calibration, for example.

As described above, the gain of the output voltage can be increased in accordance with the number of vibration sensors 10 combined according to the present embodiment. The vibration sensors 30A/30B can be achieved in which a plurality of vibration sensors can be driven by batch during calibration, for example.

The vibration sensors 10/20 each has a sectional structure and other structures, operations, and effects similar to those of the above embodiment, and detailed description thereof is thus omitted.

Fourth Embodiment

Subsequently, a vibration sensor according to a fourth embodiment is described in detail with reference to the drawings. While the vibration sensors 10/20 having the cantilever structure or the fixed-fixed beam structure are illustrated by example in the above embodiments, vibration sensors are described with examples that each include a structure in which a drive portion is shared across a plurality of vibration sensors by tying respective one ends of the vibration sensors in a bundle in the present embodiment. In the description below, components similar to those in the above embodiments are given the same reference numerals, and overlapping description thereof is omitted.

First Example

Figure 12A:
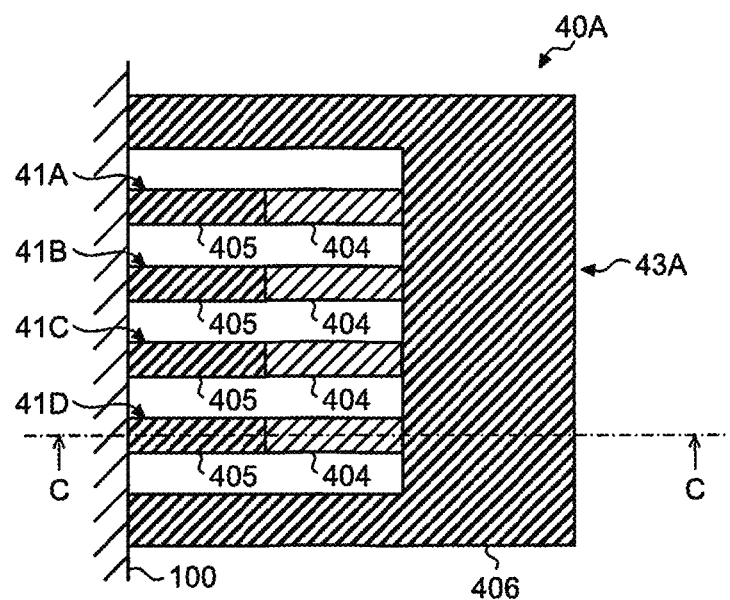
FIG. 12A is a schematic diagram illustrating an example structure of a vibration sensor according to a first example of a fourth embodiment.
Figure 12B:
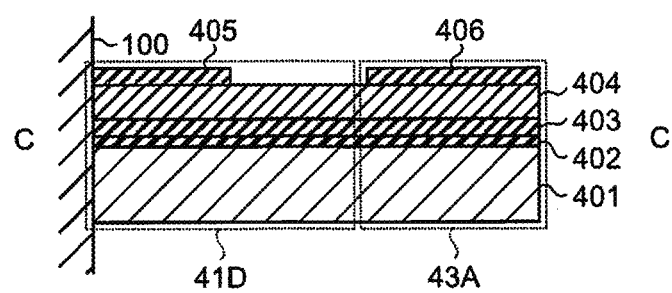
FIG. 12B is a schematic diagram illustrating an example structure of a vibration sensor according to a first example of a fourth embodiment.

FIG. 12A and FIG. 12B are schematic diagrams illustrating an example structure of a vibration sensor according to a first example of the present embodiment. FIG. 12A is a top view of a vibration sensor 40A, and FIG. 12B is a sectional view taken along line C-C in FIG. 12A. As illustrated in FIG. 12A and FIG. 12B, the vibration sensor 40A according to the first example includes a plurality of (four in the present example) sensor parts 41A to 41D that each have a cantilever structure and that are arranged at predetermined spacings, and a U-shaped drive part 43A that binds the free end sides of the sensor parts 41A to 41D. In other words, the vibration sensor 40A according to the first example includes a structure in which the drive portion (corresponding to the drive part 43A) is shared across a plurality of vibration sensors each having a cantilever structure, so that the respective tips of the sensor parts 41A to 41D are bound together.

The sensor parts 41A to 41D each include a structure in which a support layer 401, an insulating layer 402, a common electrode 403, a piezoelectric layer 404, and a sensing electrode 405 are laminated, as is the case with the sensor portions in the vibration sensors 10/20 illustrated by example in the above embodiments, for example. In the first example, however, the sensing electrode 405 has the same width as the width W of the piezoelectric layer 404. The drive part 43A also includes a structure in which the support layer 401, the insulating layer 402, the common electrode 403, the piezoelectric layer 404, and a drive electrode 406 are laminated, as is the case with the drive portions in the vibration sensors 10/20.

In this manner, the structure in which the free end sides of the sensor parts 41A to 41D each having a cantilever structure are bound by the drive part 43A can prevent sensitivity degradation of the sensor caused by drifts of the resonance frequencies of the sensor parts 41A to 41D.

Second Example

Figure 13A:
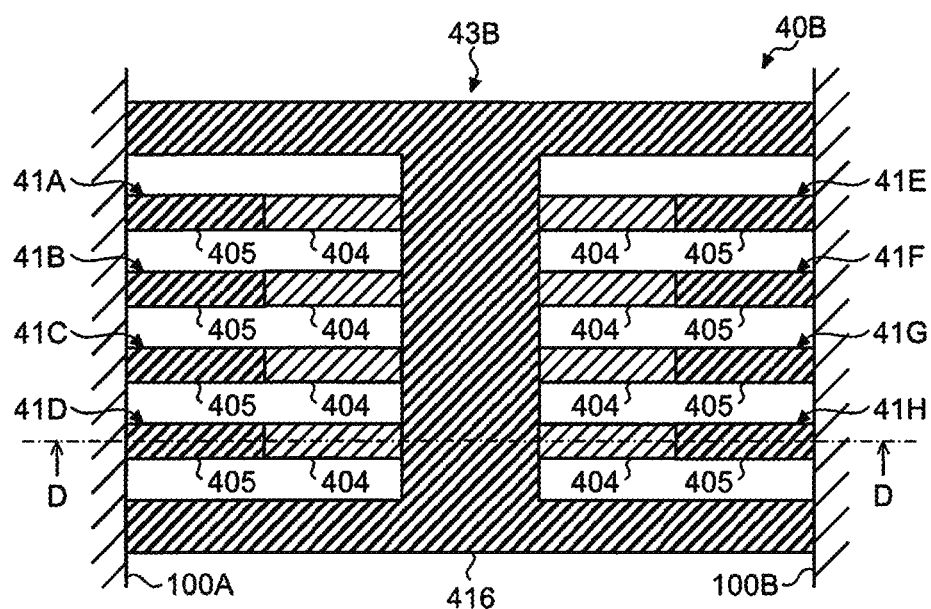
FIG. 13A is a schematic diagram illustrating an example structure of a vibration sensor according to a second example of the fourth embodiment.
Figure 13B:
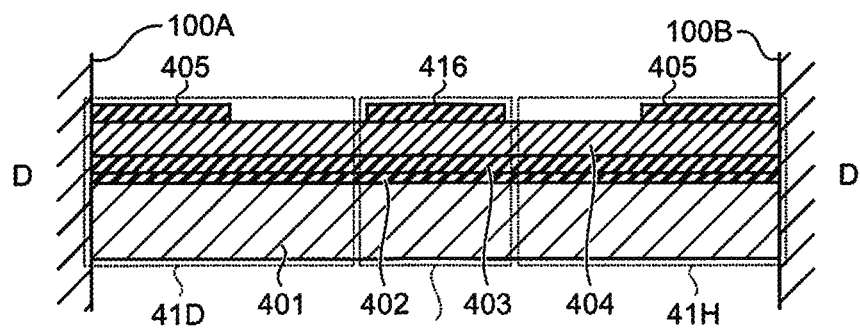
FIG. 13B is a schematic diagram illustrating an example structure of a vibration sensor according to a second example

FIG. 13A and FIG. 13B are schematic diagrams illustrating an example structure of a vibration sensor according to a second example of the present embodiment. FIG. 13A is a top view of a vibration sensor 40B, and FIG. 13B is a sectional view taken along line D-D in FIG. 13A. As illustrated in FIG. 13A and FIG. 13B, the vibration sensor 40B according to the second example includes a plurality of (four and four in the present example) sensor parts 41A to 41D and 41E to 41H that each have a cantilever structure and that are arranged at predetermined spacings, and an H-shaped drive part 43B that binds the free end sides of the sensor parts 41A to 41D and 41E to 41H. A drive electrode 416 of the drive part 43B is H-shaped. Of the sensor parts 41A to 41D and 41E to 41H each having a cantilever structure, sensor parts facing each other substantially constitute a vibration sensor having a fixed-fixed beam structure. The vibration sensor 40B according to the second example therefore includes a structure in which a drive portion (corresponding to the drive part 43B) is shared across a plurality of vibration sensors each having a fixed-fixed beam structure, so that the respective tips of the sensor parts 41A to 41D and 41E to 41H are bound together.

The sensor parts 41A to 41D and 41E to 41H and the drive part 43B may include a laminar structure similar to the structure of the sensor parts 41A to 41D and the drive part 43A described above.

In this manner, the structure in which the drive part 43B is used as the common drive portion in the vibration sensor that has a fixed-fixed beam structure and that is made up of the sensor parts 41A to 41D and 41E to 41H, and the free end sides of the sensor parts 41A to 41D and 41E to 41H are bound can prevent sensitivity degradation of the sensor caused by drifts of the resonance frequencies of the sensor parts 41A to 41D and 41E to 41H, as is the case with the first example.

Third Example

Figure 14:
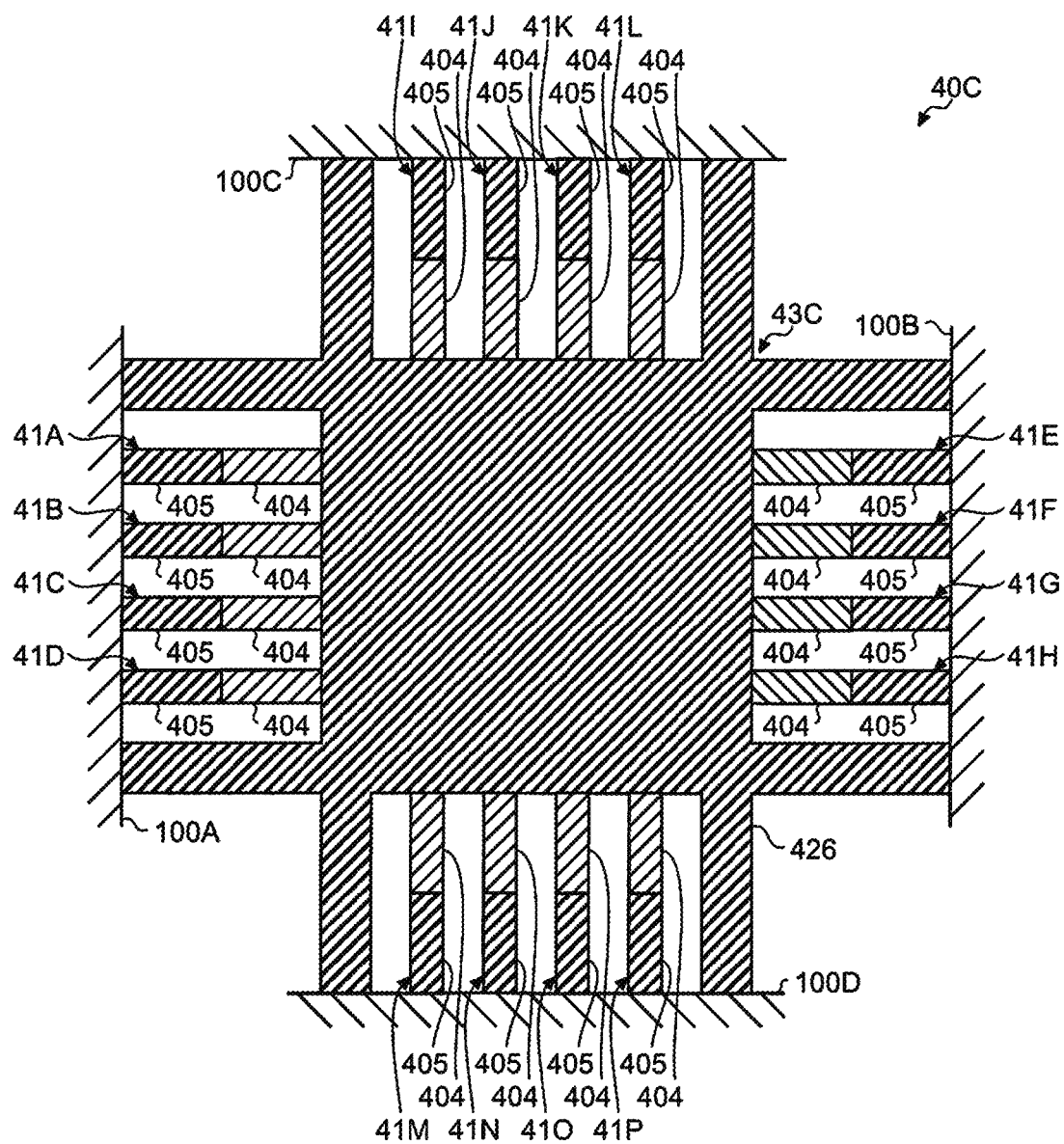
FIG. 14 is a top view illustrating an example structure of a vibration sensor according to a third example of the fourth embodiment.

FIG. 14 is a top view illustrating an example structure of a vibration sensor according to a third example of the present embodiment. As illustrated in FIG. 14, a vibration sensor 40C according to the third example includes a plurality of (four in the present example) sensor parts 41A to 41D, 41E to 41H, 41I to 41L, and 41M to 41P that each have a cantilever structure and that are arranged at predetermined spacings, and a rectangular drive part 43C that binds the free end sides of the sensor parts 41A to 41P. In other words, the vibration sensor 40C according to the third example includes a structure to hang the rectangular drive part 43C located in the center so as to be surrounded by the sensor parts 41A to 41D, 41E to 41H, 41I to 41L, and 41M to 41P. The drive part 43C binds together the tips of the sensor parts 41A to 41D, 41E to 41H, 41I to 41L, and 41M to 41P. The corner portions of the rectangular drive part 43C are connected to support 100A to 100D. The rectangular corner portions of a drive electrode 426 extend to the support 100A to 100D.

The sensor parts 41A to 41P and the drive part 43C may include a laminar structure similar to the structure of the sensor parts 41A to 41D and the drive part 43A described above.

In this manner, a structure to hang the central rectangular drive part 43C on every side with the sensor parts 41A to 41D, 41E to 41H, 41I to 41L, and 41M to 41P having a cantilever structure enables the number of sensor parts to be increased, so that the sensitivity of the vibration sensor 40C can be further enhanced. The drive part 43C is not limited to be rectangular, and may be changed into various shapes, such as a circle, oval, and a polygon with three or more sides.

Fourth Example, Fifth Example, and Sixth Example

Figure 15:
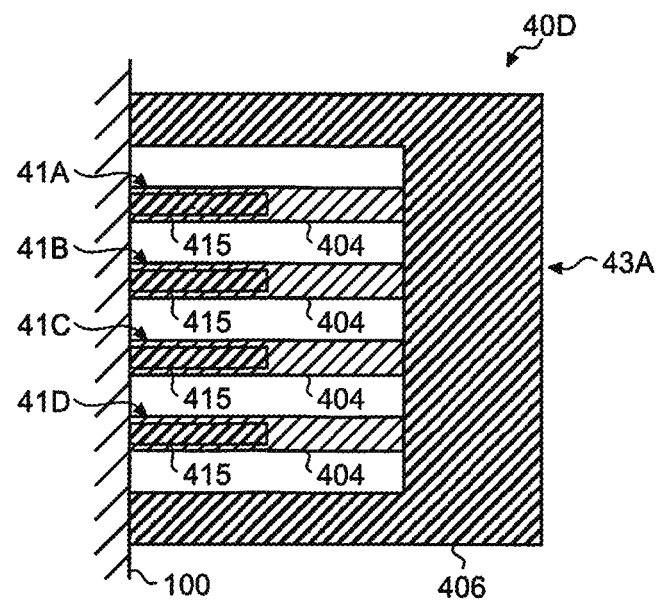
FIG. 15 is a top view illustrating an example structure of a vibration sensor according to a fourth example of the fourth embodiment.
Figure 16:
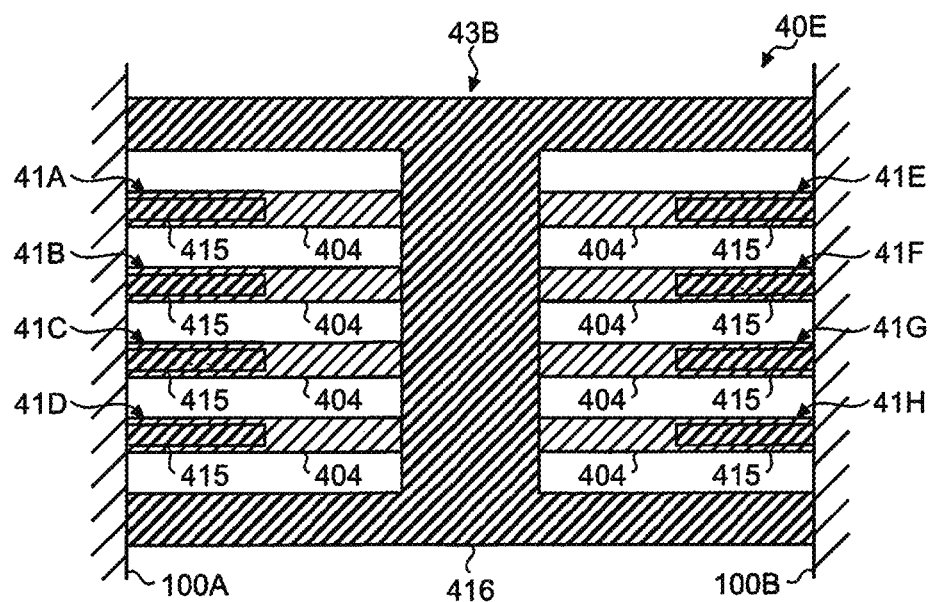
FIG. 16 is a top view illustrating an example structure of a vibration sensor according to a fifth example of the fourth embodiment.
Figure 17:
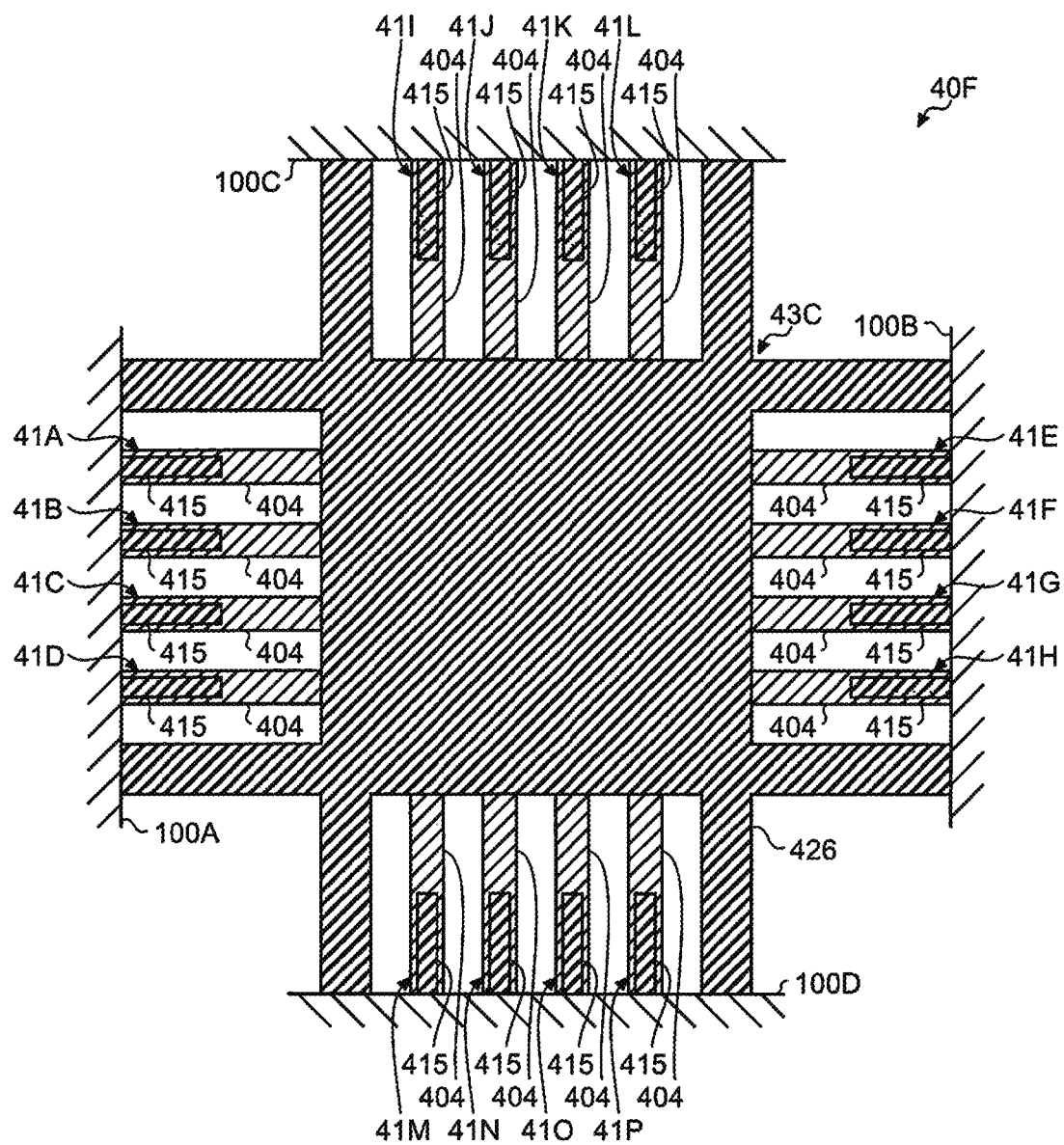
FIG. 17 is a top view illustrating an example structure of a vibration sensor according to a sixth example of the fourth embodiment.

FIG. 15 is a top view illustrating an example structure of a vibration sensor according to a fourth example of the present embodiment. FIG. 16 is a top view illustrating an example structure of a vibration sensor according to a fifth example of the present embodiment. FIG. 17 is a top view illustrating an example structure of a vibration sensor according to a sixth example of the present embodiment.

In a vibration sensor 40D according to the fourth example, which has a structure similar to the structure of the vibration sensor 40A according to the first example illustrated in FIG. 12A and FIG. 12B, the respective sensing electrodes 405 in the sensor parts 41A to 41D are replaced with sensing electrodes 415, as illustrated in FIG. 15. Likewise, in a vibration sensor 40E according to the fifth example, which has a structure similar to the structure of the vibration sensor 40B according to the second example illustrated in FIG. 13A and FIG. 13B, the respective sensing electrodes 405 in the sensor parts 41A to 41D and 41E to 41H are replaced with the sensing electrodes 415, as illustrated in FIG. 16. Likewise, in a vibration sensor 40F according to the sixth example, which has a structure similar to the structure of the vibration sensor 40C according to the third example illustrated in FIG. 14, the respective sensing electrodes 405 in the sensor parts 41A to 41P are replaced with the sensing electrodes 415, as illustrated in FIG. 17. The sensing electrode 415 has a width reduced by the predetermined contraction ratio Wc with respect to the width W of the piezoelectric layer 404 as is the case with the first embodiment, for example.

In this manner, the width of each sensing electrode 415 is optimized in the fourth example, the fifth example, and the sixth example. Consequently, the sensitivity of the vibration sensors 40D, 40E, and 40F can be further enhanced.

Other structures, operations, and effects are similar to those of the above embodiments, and detailed description thereof is thus omitted.

Fifth Embodiment

Subsequently, a vibration sensor according to a fifth embodiment is described in detail with reference to the drawings. In the above embodiments, one of the sensing electrodes 105/405/415 constitutes one sensor portion in the vibration sensors. In contrast to this, a case is described with an example in which the sensing electrodes 105/405/415 in the sensor portions are each split into a plurality in the fifth embodiment. In the description below, components similar to those in the above embodiments are given the same reference numerals, and overlapping description thereof is omitted. The description below is based on the vibration sensor 10 according to the first embodiment for convenience of description, but not limited thereto. The same applies to the vibration sensors according to the other embodiments.

Figure 18A:
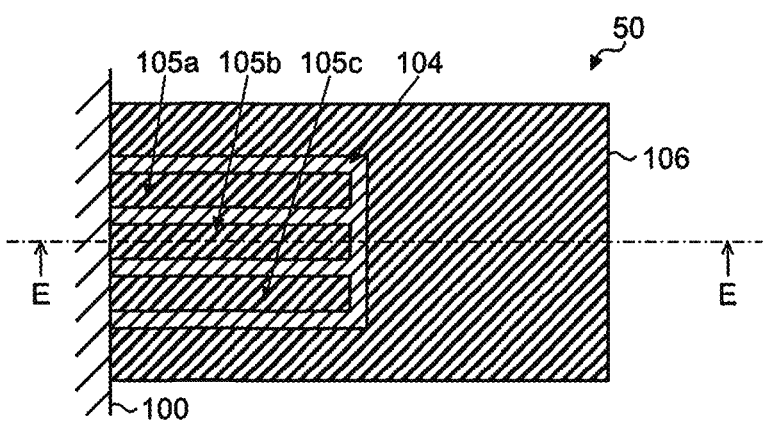
FIG. 18A is a schematic diagram illustrating an example structure of a vibration sensor according to a fifth embodiment.
Figure 18B:
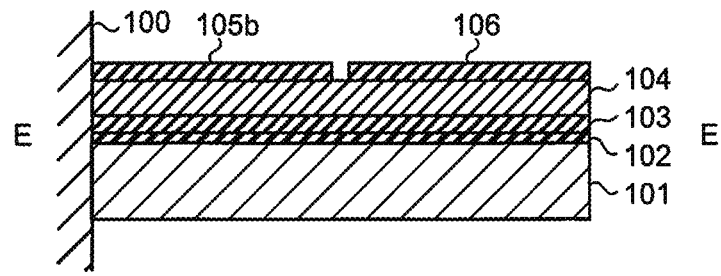
FIG. 18B is a schematic diagram illustrating an example structure of a vibration sensor according to a fifth embodiment.

FIGS. 18A and 18B are schematic diagrams illustrating an example structure of a vibration sensor according to the present embodiment. FIG. 18A is a top view of a vibration sensor 50, and FIG. 18B is a sectional view taken along line E-E in FIG. 18A.

As illustrated in FIG. 18A, the vibration sensor 50 according to the present embodiment includes a structure in which the sensing electrode 105 is replaced with a plurality of (three in the present example) split electrodes 105a to 105c, in a structure similar to the structure of the vibration sensor 10 according to the first embodiment.

A plurality of split electrodes 105a to 105c are electrically connected in series, for example. This enables vibrations to be detected more effectively. Consequently, the sensitivity to vibrations can be enhanced.

The vibration sensor 50 has a sectional structure and other structures, operations, and effects similar to those of the above embodiments, and detailed description thereof is thus omitted.

Sixth Embodiment

Subsequently, a vibration sensor according to a sixth embodiment is described in detail with reference to the drawings. In the above embodiments, the size and shape of the common electrode 103 are assumed to be the same as the size and shape of the first principal surface of the piezoelectric layer 104. In contrast to this, a case is described in detail with reference to the drawings in which the size and shape of the common electrode 103 are varied depending on the size and shape of the sensing electrode 105, for example, in the present embodiment. In the description below, components similar to those in the above embodiments are given the same reference numerals, and overlapping description thereof is omitted. The description below is based on the vibration sensor 10 according to the first embodiment for convenience of description, but not limited thereto. The same applies to the vibration sensors according to the other embodiments.

Figure 19A:
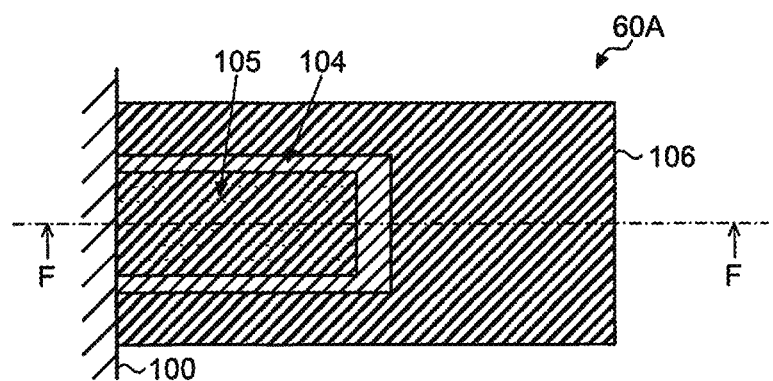
FIG. 19A is a schematic diagram illustrating an example structure of a vibration sensor according to a sixth embodiment.
Figure 19B:
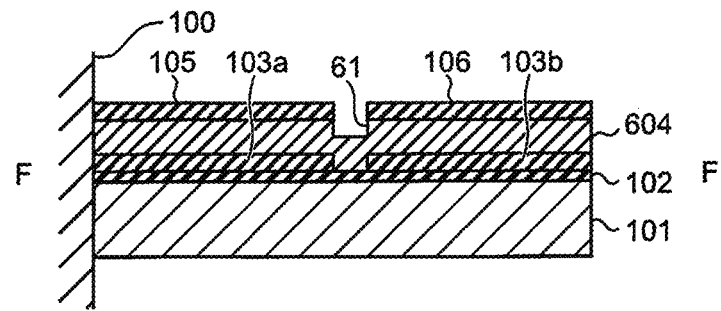
FIG. 19B is a schematic diagram illustrating an example structure of a vibration sensor according to a sixth embodiment.

FIGS. 19A and 19B are schematic diagrams illustrating an example structure of a vibration sensor according to the present embodiment. FIG. 19A is a top view of a vibration sensor 60A, and FIG. 19B is a sectional view taken along line F-F in FIG. 19A.

As illustrated in FIGS. 19A and 19B, the vibration sensor 60A according to the present embodiment includes a structure in which the common electrode 103 is replaced with common electrodes 103a and 103b, in a structure similar to the structure of the vibration sensor 10 according to the first embodiment, for example. The common electrode 103a has the same size as the size of the sensing electrode 105, for example, and the common electrode 103b has the same size as the size of the drive electrode 106, for example.

As illustrated in FIGS. 19A and 19B, a trench 61 arising from a gap between the common electrodes 103a and 103b is present in a piezoelectric layer 604, depending on a manufacturing process during which the vibration sensor 60A is manufactured.

The sizes of the sensing electrode 105 and the common electrode 103a are described next. In the present embodiment, the common electrode 103a, which replaces the common electrode 103 in the vibration sensor illustrated with reference to FIG. 2, has been used for a study to determine the sizes of the sensing electrode 105 and the common electrode 103a. Note that the material and the film thickness of the common electrode 103a are the same as those of the common electrode 103.

Figure 20:
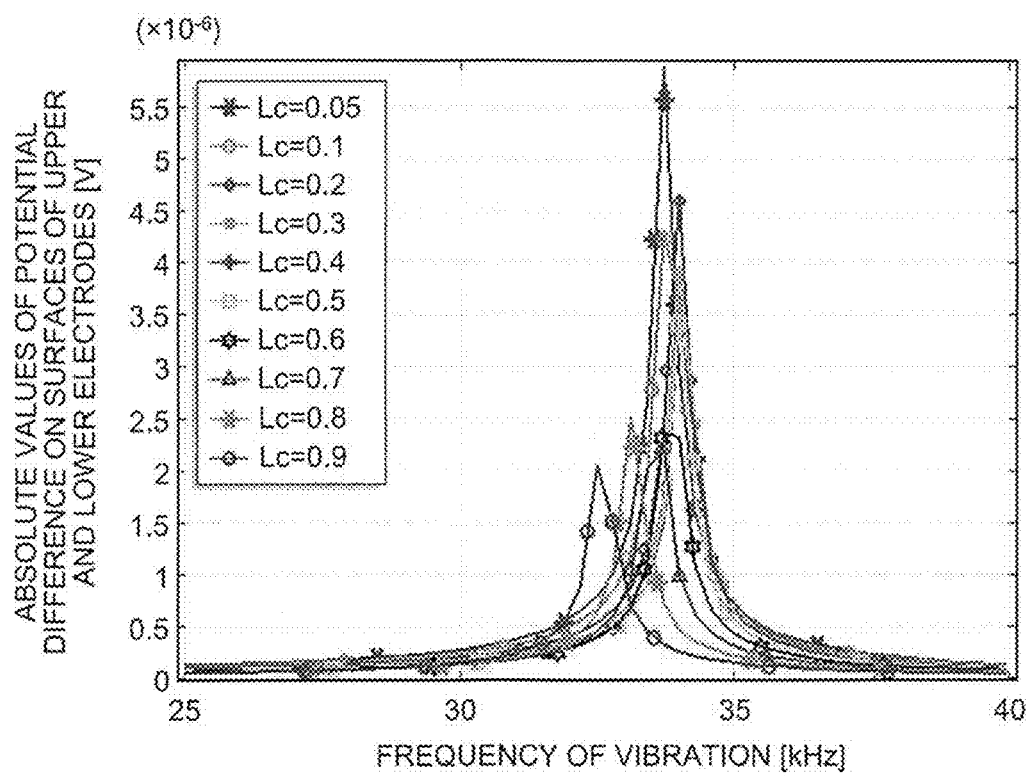
FIG. 20 is a graph illustrating sensitivity characteristics with respect to the contraction ratio of the electrode in the length direction of the vibration sensor according to the sixth embodiment.
Figure 21:
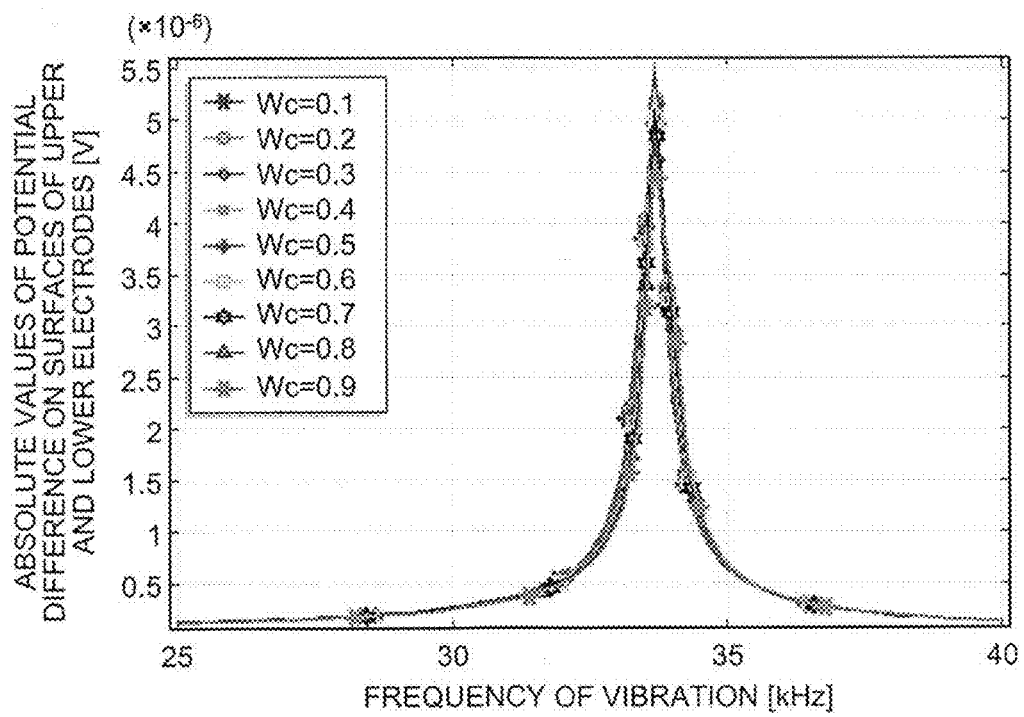
FIG. 21 is a graph illustrating sensitivity characteristics with respect to the contraction ratio of the electrode in the width direction of the vibration sensor according to the sixth embodiment.

FIG. 20 is a graph illustrating sensitivity characteristics with respect to the contraction ratio of the electrode in the length direction of the vibration sensor according to the present embodiment. FIG. 21 is a graph illustrating sensitivity characteristics with respect to the contraction ratio of the electrode in the width direction of the vibration sensor according to the present embodiment. FIG. 20 and FIG. 21, as is the case with FIG. 3 and FIG. 4, illustrate sensitivity characteristics as absolute values (corresponding to the output voltages) of the potential difference on the surfaces of upper and lower electrodes (corresponding to the common electrode 103a and the sensing electrode 105) with respect to the frequency of the vibration.

FIG. 20 illustrates the sensitivity characteristics when the contraction ratio Lc of the sensing electrode 105 and the common electrode 103a in the length direction is changed from 0.05 to 0.9. As illustrated in FIG. 20, in a case in which the shape and size of the common electrode 103a are matched to the shape and size of the sensing electrode 105, the sensitivity characteristics of the vibration sensor 60A are improved with decreased contraction ratio Lc, in other words, with decreased ratio with respect to the length L of the cantilever structure. The sensitivity characteristics are most favorable when the contraction ratio Lc is equal to or lower than 0.1. When the contraction ratio Lc is equal to or lower than 0.5, the sensitivity characteristics of the vibration sensor 60A are kept in a favorable range. When the contraction ratio Lc is equal to or lower than 0.9, adequate sensitivity characteristics of the vibration sensor 60A are achieved.

FIG. 21 illustrates the sensitivity characteristics when the contraction ratio Wc of the sensing electrode 105 and the common electrode 103a in the width direction is changed by 0.1 from 0.1 to 0.9. As illustrated in FIG. 21, the sensitivity characteristics of the vibration sensor 60A are stable toward the change of the sensing electrode 105 and the common electrode 103a in the width direction, although the sensitivity characteristics of the vibration sensor 60A are most favorable when the contraction ratio Wc is 0.5. When the contraction ratio Wc is within a range of 0.3 to 0.7, the sensitivity characteristics of the vibration sensor 60A are kept in a favorable range. Even when the contraction ratio Wc is within a range of 0.1 to 0.3 or 0.7 to 0.9, it is evident that adequate sensitivity characteristics of the vibration sensor 60A are achieved.

However, the sensing electrode 105 and the common electrode 103a have lower limits of the length and width because of the constraints arising from their manufacturing process, the sensing electrode 105 and the common electrode 103a preferably have lengths and widths that are equal to or greater than the lower length and width limits (for example, a few micrometers to 10 micrometers).

A description is now given of which of the following two cases obtains better sensitivity characteristics: a case in which the common electrode 103 has a fixed size that is the same as the size of the piezoelectric layer 104 (for example, the first embodiment); and a case in which the shape and size of the common electrode 103a are matched to the shape and size of the sensing electrode 105 (for example, the present embodiment). In the description, the length and the width of the sensing electrode 105 are assumed to be half the length L and the width W of the piezoelectric layer 104, in other words, the contraction ratios Lc and Wc are both assumed to be 0.5.

Figure 22:
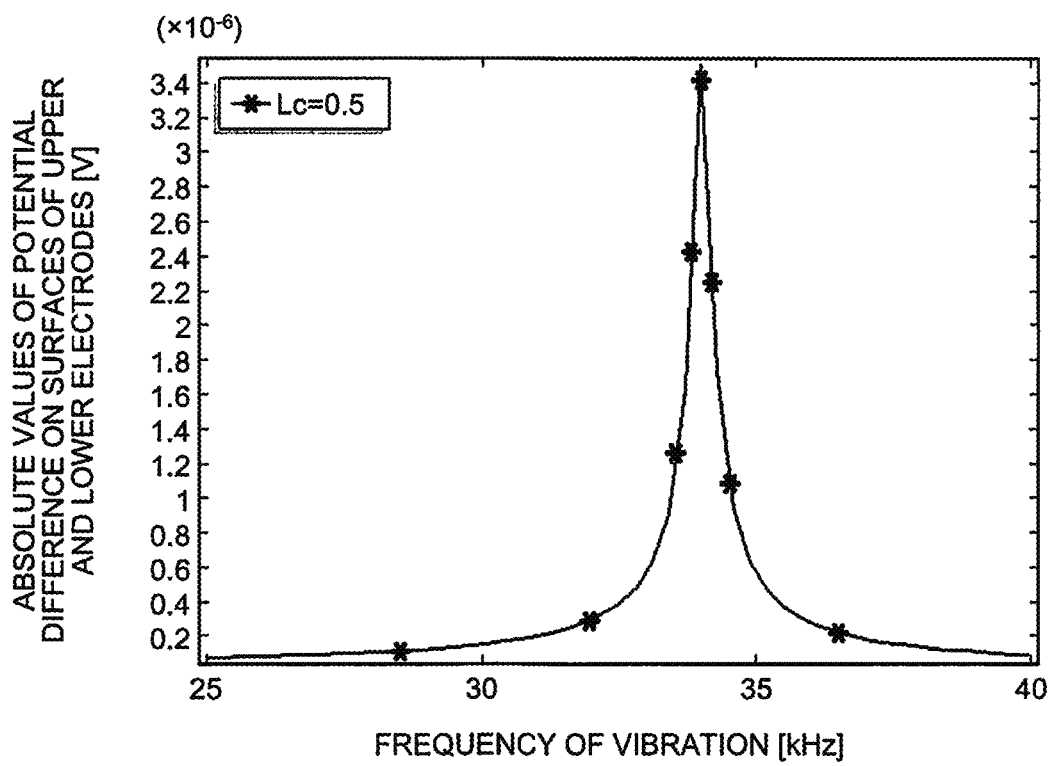
FIG. 22 is a graph illustrating sensitivity characteristics in the vicinity of the resonance frequency of the vibration sensor in a case in which the shape and size of a common electrode are matched to the shape and size of a sensing electrode in the sixth embodiment.
Figure 23:
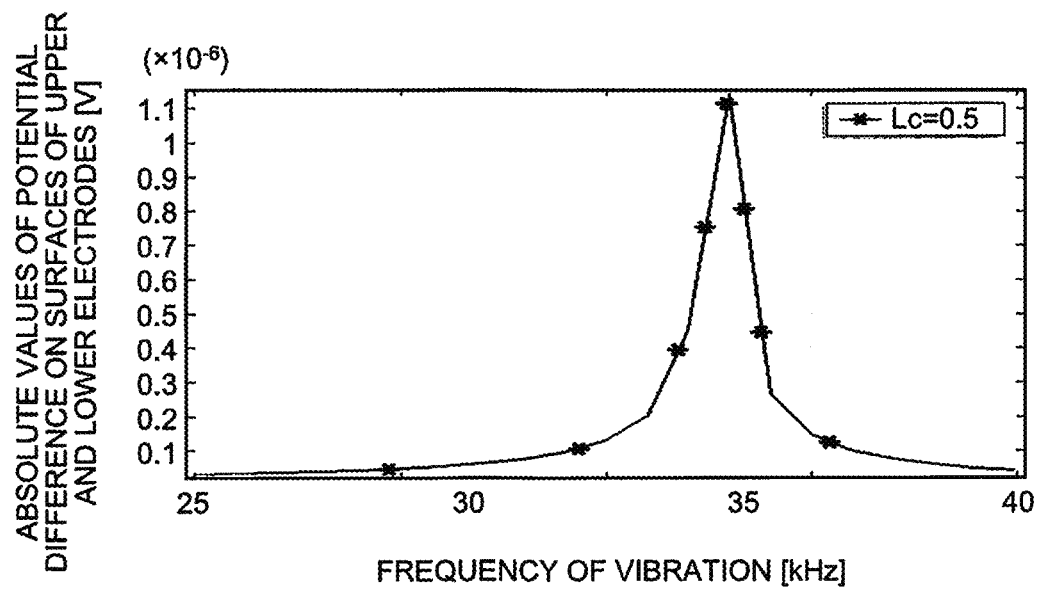
FIG. 23 is a graph illustrating sensitivity characteristics in the vicinity of the resonance frequency of the vibration sensor in a case in which the common electrode has a fixed size that is the same as the size of a piezoelectric layer in the sixth embodiment.

FIG. 22 illustrates sensitivity characteristics in the vicinity of the resonance frequency of the vibration sensor in a case in which the shape and size of the common electrode are matched to the shape and size of the sensing electrode. FIG. 23 illustrates sensitivity characteristics in the vicinity of the resonance frequency of the vibration sensor in a case in which the common electrode has a fixed size that is the same as the size of the piezoelectric layer. FIG. 22 and FIG. 23, as is the case with FIG. 20 and FIG. 21, illustrate sensitivity characteristics as absolute values (corresponding to the output voltages) of the potential difference on the surfaces of upper and lower electrodes (corresponding to the common electrodes 103/103a and the sensing electrodes 105) with respect to the frequency of the vibration.

As is evident from comparison between FIG. 22 and FIG. 23, the output voltage of the vibration sensor is increased more in the case in which the shape and size of the common electrode 103a are matched to the shape and size of the sensing electrode 105 (for example, the present embodiment) than the case in which the common electrode 103 has a fixed size that is the same as the size of the piezoelectric layer (for example, the first embodiment). This shows that the sensitivity characteristics are enhanced more with the vibration sensor having a structure in which the shape and size of the common electrode 103a are matched to the shape and size of the sensing electrode 105 (for example, the vibration sensor 60A) than the vibration sensor having a structure in which the common electrode 103 has a fixed size that is the same as the size of the piezoelectric layer (for example, the vibration sensor 10).

Thus, optimizing the sizes of the sensing electrode 105 and the common electrode 103a can further improve the output voltage, thereby further enhancing the sensitivity to vibrations.

Figure 24:
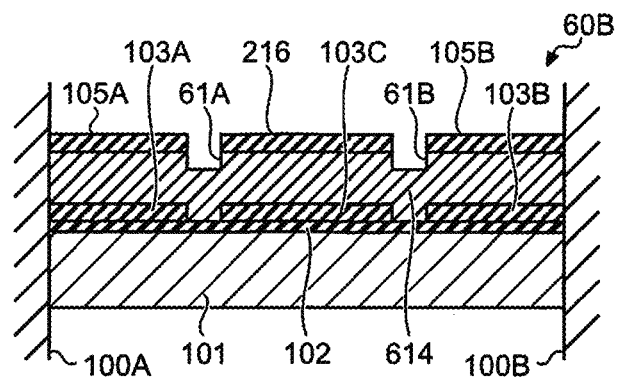
FIG. 24 is a schematic diagram illustrating an example structure of another vibration sensor according to the sixth embodiment.

The findings as described above are not limited to the vibration sensor 60A based on the vibration sensor 10 having the cantilever structure according to the first embodiment. The same can apply to a vibration sensor 60B, as illustrated in FIG. 24, for example, based on the vibration sensor 20 having the fixed-fixed beam structure according to the second embodiment. In the vibration sensor 60B illustrated in FIG. 24, the common electrode 103 is split into a common electrode 103A corresponding to the sensing electrode 105A, a common electrode 103B corresponding to the sensing electrode 105B, and a common electrode 103C corresponding to a drive electrode 216. Trenches 61A and 61B arising from gaps between the common electrodes 103A to 103C are present in a piezoelectric layer 614.

Although FIG. 19A, FIG. 19B, and FIG. 24 illustrate by example the cases in which the common electrode 103 is separated to conform to the shapes of the sensing electrodes 105/105A/105B and the drive electrodes 106/216, the vibration sensors are not limited to these structures. Structures can be such that, in addition to the common electrode 103, the piezoelectric layer 104 is also separated to conform to the shapes of the sensing electrodes 105/105A/105B and the drive electrodes 106/216, as illustrated in FIG. 25 and FIG. 26, for example.

Figure 25:
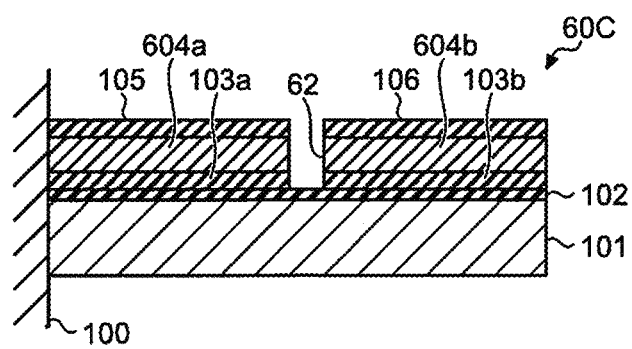
FIG. 25 is a schematic diagram illustrating an example structure of still another vibration sensor according to the sixth embodiment.

A vibration sensor 60C illustrated in FIG. 25 is based on the vibration sensor 10 according to the first embodiment, for example, and includes a structure in which the piezoelectric layer 604 is replaced with piezoelectric layers 604a and 604b, in a structure similar to the structure of the vibration sensor 60A illustrated in FIG. 19A and FIG. 19B, for example. The piezoelectric layers 604a has the same size as the size of the sensing electrode 105, for example, and the piezoelectric layers 604b has the same size as the size of the drive electrode 106, for example. A trench 62, on the underside thereof, exposes the insulating layer 102.

Figure 26:
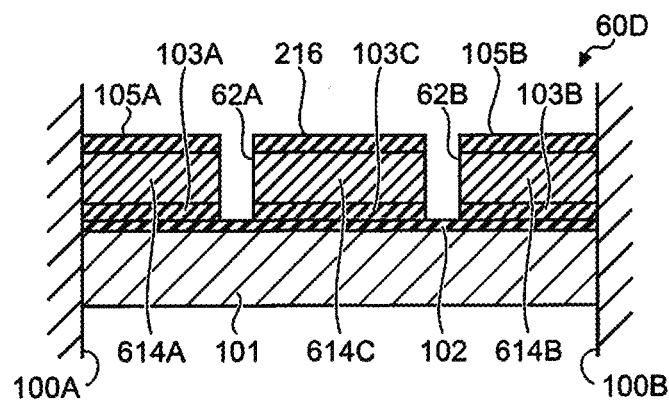
FIG. 26 is a schematic diagram illustrating an example structure of still another vibration sensor according to the sixth embodiment.

A vibration sensor 60D illustrated in FIG. 26 is based on the vibration sensor 20 according to the second embodiment, for example, and includes a structure in which the piezoelectric layer 614 is replaced with piezoelectric layers 614A, 614B, and 614C, in a structure similar to the structure of the vibration sensor 60B illustrated in FIG. 24, for example. The piezoelectric layers 614A has the same size as the size of the sensing electrode 105A, for example, the piezoelectric layers 614B has the same size as the size of the sensing electrode 105B, for example, and the piezoelectric layers 614C has the same size as the size of the drive electrode 216, for example. Trenches 62A and 62B, on the underside thereof, expose the insulating layer 102.

Each of the vibration sensors 60A, 60B, 60C, and 60D0 has a sectional structure and other structures, operations, and effects similar to those of the above embodiments, and detailed description thereof is thus omitted.

Seventh Embodiment

Subsequently, a vibration sensor according to a seventh embodiment is described in detail with reference to the drawings. In the third embodiment described above, the vibration sensors 10/20 both having the same length L are arrayed and electrically connected. In contrast to this, a case is described with an example in which vibration sensors having a length L different from each other are arrayed and electrically connected in the present embodiment. In the description below, components similar to those in the above embodiments are given the same reference numerals, and overlapping description thereof is omitted.

First Example

Figure 27:
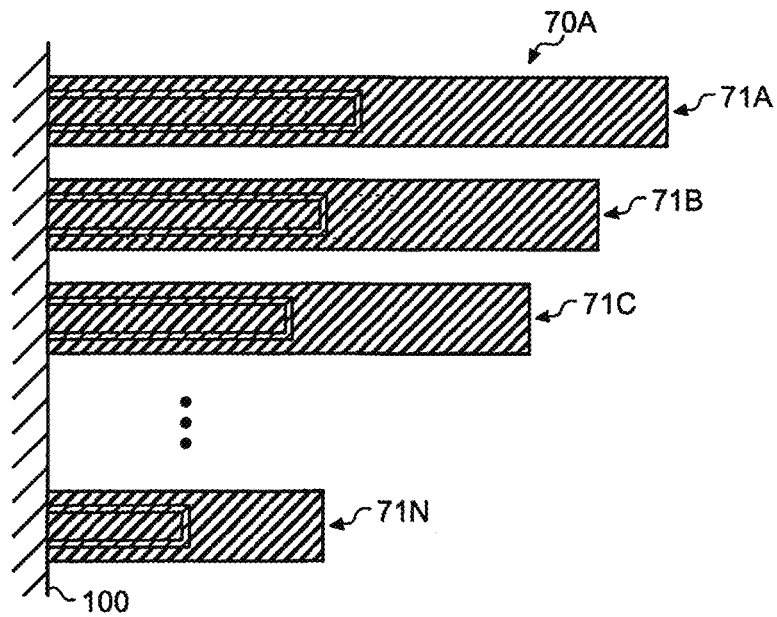
FIG. 27 is a top view illustrating an example structure of a vibration sensor according to a first example of a seventh embodiment.

FIG. 27 is a top view illustrating an example structure of a vibration sensor according to a first example. As illustrated in FIG. 27, a vibration sensor 70A according to the first example includes one each of vibration sensors 71A to 71N having a cantilever structure and having a length L different from each other. The vibration sensors 71A to 71N may be fixed to the same support 100, or at least a part thereof may be fixed to a different support. The exemplary electric connection of the sensor part and the drive part as well as the sectional structure of the vibration sensors 71A to 71N may be the same as those of any of the vibration sensors having a cantilever structure in the above embodiments, for example.

Second Example

Figure 28:
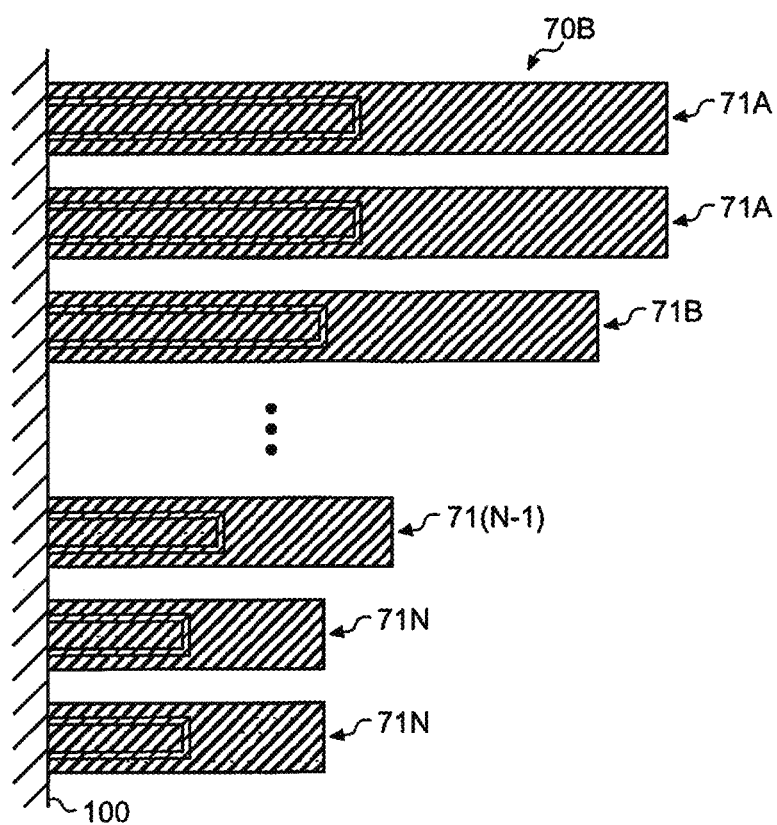
FIG. 28 is a top view illustrating an example structure of a vibration sensor according to a second example of the seventh embodiment.

FIG. 28 is a top view illustrating an example structure of a vibration sensor according to a second example. As illustrated in FIG. 28, a vibration sensor 70B according to the second example includes a plurality of each (two each in the present example) of vibration sensors 71A to 71N each having the same length L, in a structure similar to the structure of the vibration sensor 70A according to the first example.

Third Example

Figure 29:
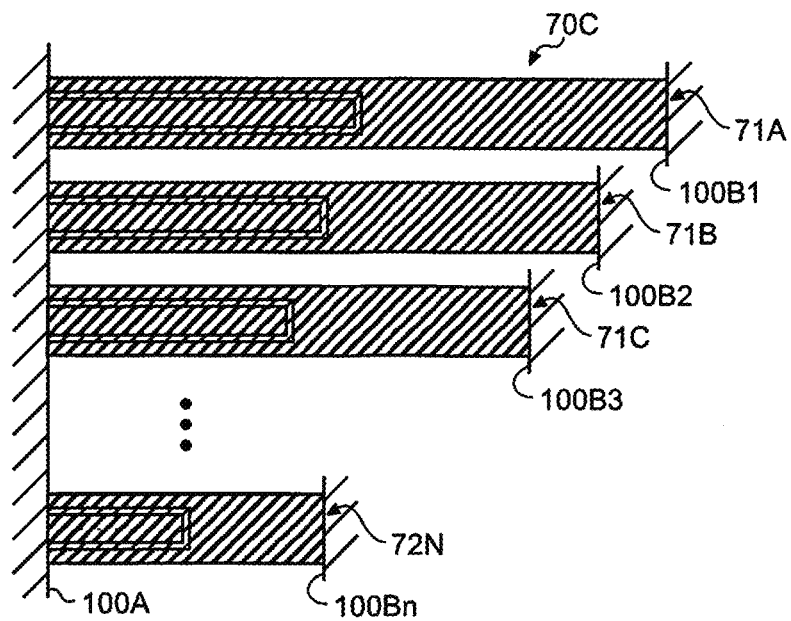
FIG. 29 is a top view illustrating an example structure of a vibration sensor according to a third example of the seventh embodiment.

FIG. 29 is a top view illustrating an example structure of a vibration sensor according to a third example. As illustrated in FIG. 29, a vibration sensor 70C according to the third example has a structure in which the respective free end sides of the vibration sensors 71A to 71N are fixed to supports 100B1 to 100Bn, in a structure similar to the structure of the vibration sensor 70A according to the first example. The supports 100B1 to 100Bn may be one support, or a support split into a plurality.

Fourth Example

Figure 30:
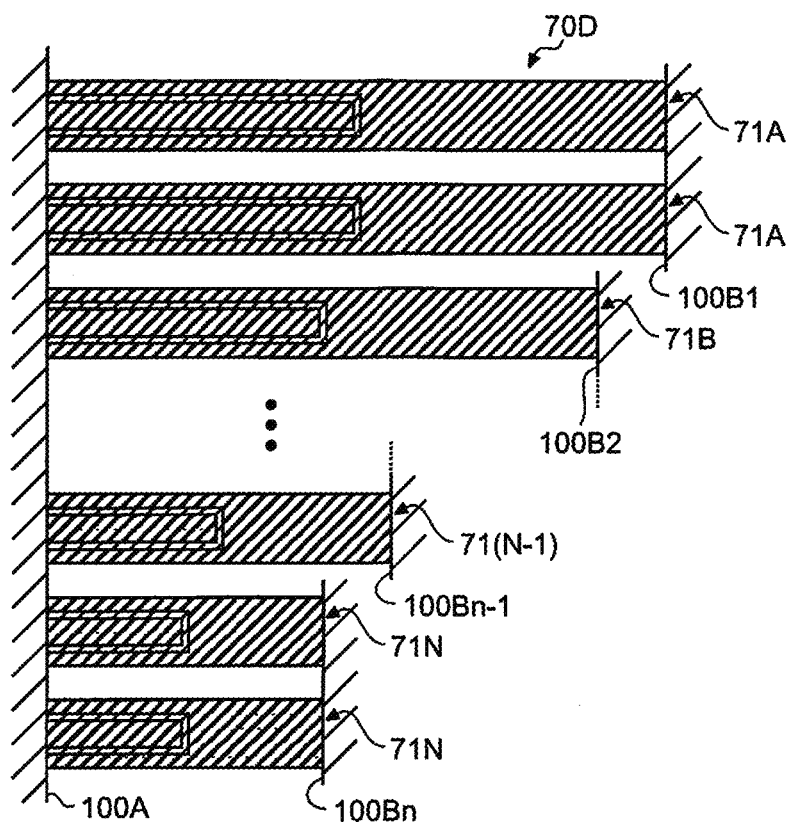
FIG. 30 is a top view illustrating an example structure of a vibration sensor according to a fourth example of the seventh embodiment.

FIG. 30 is a top view illustrating an example structure of a vibration sensor according to a fourth example. As illustrated in FIG. 30, a vibration sensor 70D according to the fourth example has a structure in which the respective free end sides of the vibration sensors 71A to 71N each having the same length L are fixed to respective common supports 100B1 to 100Bn, in a structure similar to the structure of the vibration sensor 70B according to the second example. The supports 100B1 to 100Bn may be one support, or a support split into a plurality.

Fifth Example

Figure 31:
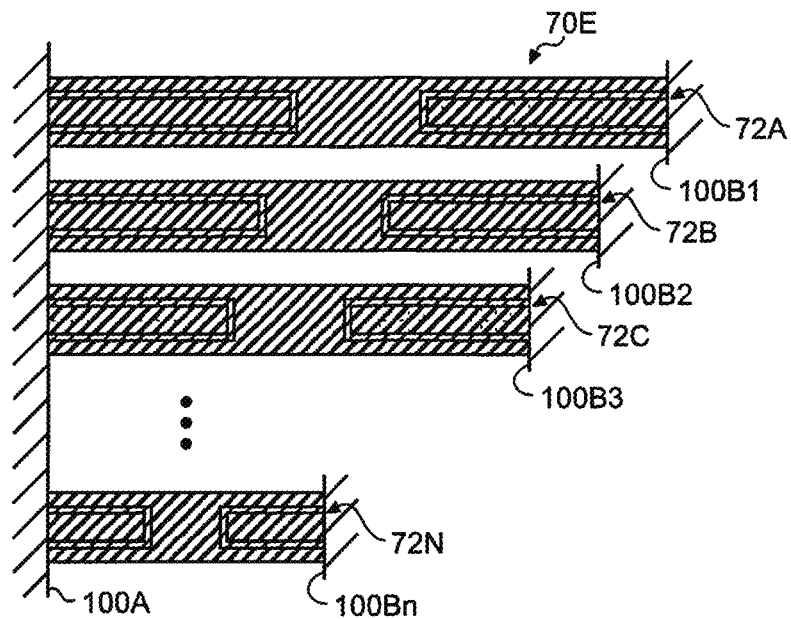
FIG. 31 is a top view illustrating an example structure of a vibration sensor according to a fifth example of the seventh embodiment.

FIG. 31 is a top view illustrating an example structure of a vibration sensor according to a fifth example. As illustrated in FIG. 31, a vibration sensor 70E according to the fifth example has a structure in which the vibration sensors 71A to 71N having a cantilever structure and having a length L different from each other is replaced with vibration sensors 72A to 72N having a fixed-fixed beam structure and having a length L different from each other, in a structure similar to the structure of the vibration sensor 70C according to the third example. The exemplary electric connection of the sensor part and the drive part as well as the sectional structure of the vibration sensors 72A to 72N may be the same as those of any of the vibration sensors having a fixed-fixed beam structure in the above embodiments, for example.

Sixth Example

Figure 32:
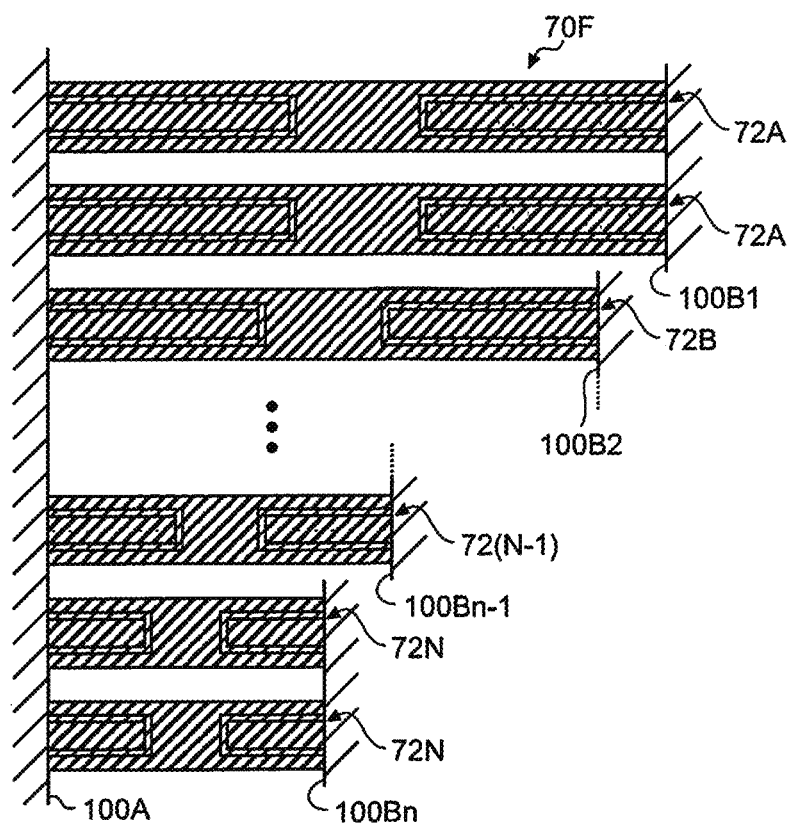
FIG. 32 is a top view illustrating an example structure of a vibration sensor according to a sixth example of the seventh embodiment.

FIG. 32 is a top view illustrating an example structure of a vibration sensor according to a sixth example. As illustrated in FIG. 32, a vibration sensor 70F according to the sixth example includes a plurality of each (two each in the present example) of vibration sensors 72A to 72N each having the same length L, in a structure similar to the structure of the vibration sensor 70E according to the fifth example.

The vibration sensors 71A to 71N and 72A to 72N each have a resonance frequency in accordance with the length L. As a result, the sensing band can be widened by arraying a plurality of vibration sensors having a length L different from each other, as in the first to the sixth examples.

At that time, the gain of the output voltage when vibrations at each resonance frequency is detected can be increased in accordance with the number of vibration sensors combined, by disposing a plurality of vibration sensors having the same length L, as in the second, the fourth, and the sixth examples.

Other structures, operations, and effects are similar to those of the above embodiments, and detailed description thereof is thus omitted.

Eighth Embodiment

Subsequently, a sensor module according to an eighth embodiment is described in detail with reference to the drawing. In the eighth embodiment, the sensor module is described with an example that includes the vibration sensors according to the above embodiments. In the description below, components similar to those in the above embodiments are given the same reference numerals, and overlapping description thereof is omitted. A case in which the vibration sensor 10 according to the first embodiment is used is described below for convenience of description, but the vibration sensor to be used is not limited thereto. The vibration sensors according to the other embodiments can also be used.

Figure 33:
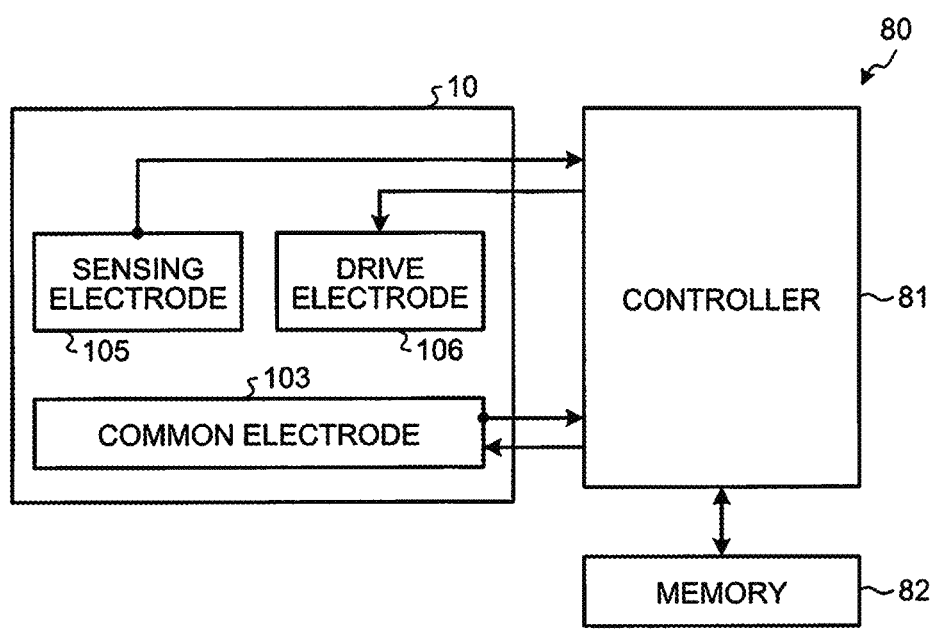
FIG. 33 is a block diagram illustrating an example structure of a sensor module according to an eighth embodiment.

FIG. 33 is a schematic diagram illustrating an example structure of the sensor module according to the present embodiment. As illustrated in FIG. 33, a sensor module 80 includes a controller 81 and a memory 82, in addition to the vibration sensor 10.

The controller 81 is made up of an information-processing device, such as a central processing unit (CPU), and detects vibrations input to the vibration sensor 10 on the basis of the potential difference arisen between the sensing electrode 105 and the common electrode 103. The controller 81 applies a voltage signal of the frequency corresponding to the resonance frequency of the vibration sensor 10 to the drive electrode 106 and the common electrode 103 during calibration of the vibration sensor 10, for example.

The memory 82 is a storage device, such as a dynamic random access memory (DRAM), and stores various computer programs and parameters to enable the operation of the controller 81 and data on vibrations detected by the vibration sensor 10. Various computer programs and parameters include computer programs and parameters to be used for calibration of the vibration sensor 10.

Other structures, operations, and effects are similar to those of the above embodiments, and detailed description thereof is thus omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vibration sensor comprising a laminated body, the laminated body including:
    a support layer having a first fixed end, and a second end opposite to the first end;
    a piezoelectric layer on the support layer;
    an insulating layer disposed between the support layer and the piezoelectric layer;
    a common electrode disposed on a first principal surface of the piezoelectric layer;
    a first sensing electrode disposed in a first area on a second principal surface of the piezoelectric layer on a side opposite to the first principal surface; and
    a drive electrode disposed in a second area different from the first area on the second principal surface of the piezoelectric layer, wherein
        the first area is located near the first end of the support layer,
        a distance between the first end and the first area is smaller than a distance between the second end and the first area, and
        the second area is an area that surrounds the first area from sides other than the first end while being spaced from the first area.

2. The vibration sensor according to claim 1, further comprising a second sensing electrode disposed in a third area on the second principal surface of the piezoelectric layer, wherein
    a second end, which is different from the first end, of the support layer is fixed, in addition to the first end, and
    the third area is located near the second end of the support layer.

3. The vibration sensor according to claim 1, comprising a plurality of the laminated bodies including a first laminated body and a second laminated body, wherein
    the first sensing electrode in the first laminated body is electrically connected to the common electrode in the second laminated body, and
    the drive electrode in the first laminated body is electrically connected to the drive electrode in the second laminated body.

4. The vibration sensor according to claim 1, comprising a plurality of the laminated bodies, wherein
    the respective support layers of the laminated bodies each include a common portion shared with other support layers on a side of a second end different from the first end, and
    the respective drive electrodes of the laminated bodies are located on the common portion of the support layers.

5. The vibration sensor according to claim 4, wherein
    the laminated bodies each include the first laminated body and the second laminated body, and
    the second laminated body is located on a side opposite to the first laminated body from the common portion.

6. The vibration sensor according to claim 4, wherein the laminated bodies are connected to the common portion so as to surround the common portion.

7. The vibration sensor according to claim 1, wherein the common electrode includes:
    a first electrode having a surface that faces the first sensing electrode, the surface having a shape identical to a shape of the first sensing electrode, the first electrode being disposed at a position confronting the first sensing electrode through the piezoelectric layer; and a second electrode having a surface that faces the drive electrode, the surface having a shape identical to a shape of the drive electrode, the second electrode being disposed at a position confronting the drive electrode through the piezoelectric layer.

8. The vibration sensor according to claim 7, wherein the piezoelectric layer includes:

a first layer having a surface that is in contact with the first sensing electrode, the surface having a shape identical to a shape of the first sensing electrode; and a second layer having a surface that is in contact with the drive electrode, the surface having a shape identical to a shape of the drive electrode.

9. The vibration sensor according to claim 7, wherein the piezoelectric layer has a surface that faces the support layer, the surface having a shape identical to a shape of the support layer.

10. The vibration sensor according to claim 7, wherein the first sensing electrode has a length beginning at a side of the first end that is equal to or smaller than 0.1 times a length of the support layer beginning at the first end.

11. The vibration sensor according to claim 7, wherein the first sensing electrode has a length beginning at a side of the first end that is equal to or smaller than 0.5 times a length of the support layer beginning at the first end.

12. The vibration sensor according to claim 1, comprising a plurality of the laminated bodies, wherein each of the laminated bodies has a length beginning at the first end that is different from lengths of other laminated bodies beginning at the first end.

13. The vibration sensor according to claim 1, comprising a plurality of the laminated bodies, wherein at least one of the laminated bodies has a length beginning at the first end that is different from lengths of other laminated bodies beginning at the first end.

14. The vibration sensor according to claim 1, wherein the support layer and the insulating layer are composed of a same material.

15. The vibration sensor according to claim 1, wherein the first sensing electrode includes a plurality of split electrodes formed in a separated area of the first area on the second principal surface.

16. The vibration sensor according to claim 15, wherein the split electrodes are electrically connected in series.

17. The vibration sensor according to claim 1, wherein the first sensing electrode has a length beginning at a side of the first end that is half a length of the support layer beginning at the first end.

18. The vibration sensor according to claim 1, wherein the first sensing electrode has a length beginning at a side of the first end that is between or equal to 0.3 times and 0.7 times a length of the support layer beginning at the first end.

19. A sensor module comprising:

the vibration sensor according to claim 1; and a controller connected to the vibration sensor, the controller configured to detect vibrations input to the vibration sensor, based on a potential difference arisen between the first sensing electrode and the common electrode, and to excite the vibration sensor by applying a voltage signal of a predetermined frequency to the drive electrode and the common electrode.

* * * * *